United States Patent [19]
Hirokane et al.

[11] Patent Number: 5,705,286
[45] Date of Patent: Jan. 6, 1998

[54] MAGNETO-OPTICAL RECORDING MEDIUM

[75] Inventors: Junji Hirokane, Nara; Yoshiteru Murakami, Nishinomiya; Hiroyuki Katayama; Akira Takahashi, both of Nara; Kenji Ohta, Kitakatsuragi-gun, all of Japan

[73] Assignee: Sharp Kabushiki Kaisha, Osaka, Japan

[21] Appl. No.: 163,096

[22] Filed: Dec. 7, 1993

[30] Foreign Application Priority Data

Dec. 10, 1992 [JP] Japan ................... 4-330626

[51] Int. Cl.$^6$ ................................ G11B 5/66
[52] U.S. Cl. ............... 428/694 ML; 428/694 MN; 428/694 EC; 428/694 DE; 428/694 SC; 428/694 IE; 428/900; 365/13
[58] Field of Search ............ 428/694 ML, 694 MM, 428/694 EC, 694 DE, 694 SC, 694 LE, 900; 369/13

[56] References Cited

U.S. PATENT DOCUMENTS

| | | | |
|---|---|---|---|
| 4,126,494 | 11/1978 | Imamura et al. | 148/301 |
| 4,152,486 | 5/1979 | Imamura et al. | 428/606 |
| 5,278,810 | 1/1994 | Takahashi et al. | 369/13 |

FOREIGN PATENT DOCUMENTS

| | | |
|---|---|---|
| 0387420 | 9/1990 | European Pat. Off. |
| 0492581 | 7/1992 | European Pat. Off. |
| 0498435 | 8/1992 | European Pat. Off. |
| 0498440 | 8/1992 | European Pat. Off. |
| 0498461 | 8/1992 | European Pat. Off. |
| 509836 | 10/1992 | European Pat. Off. |
| 0513668 | 11/1992 | European Pat. Off. |
| 73746 | 5/1983 | Japan . |

OTHER PUBLICATIONS

O. Masumi, et al. "Signal Regenerating Method in Magneto-Optical Recording Medium", Japanese Laid-Open Patent Publication No. 4-271039-A, Publication date Sep. 26, 1992.

Y. Fujii, et al., "Direct Overwriting and Super Resolution Readout by Exchange-Coupled Multilayer Film", Proceedings of Magneto-Optical Recording International Symposium '92, *J. Magn. Soc. Jpn.*, vol. 17, Supplement No. Si(1993), pp. 167–170).

M. Kaneko, et al., "Super Resolution in Magneto-Optical Disks", *Magazine of Japan Applied Magnetic Society*, vol. 15, No. 5, 1991, pp. 838–843. English Abstract Only.

*Primary Examiner*—Leszek Kiliman
*Attorney, Agent, or Firm*—David G. Conlin; William J. Daley, Jr.

[57] ABSTRACT

A magneto-optical recording medium has an exchange-coupled triplilayer film wherein a readout layer which has in-plane magnetization at room temperature, and in which a transition occurs from in-plane magnetization to perpendicular magnetization when temperature thereof is raised above $T_1$, an intermediate layer which has perpendicular magnetization at room temperature, the perpendicular magnetization being maintained from room temperature to Curie temperature $T_3$, and a recording layer which has perpendicular magnetization at room temperature, the perpendicular magnetization been maintained from room temperature to Curie temperature $T_2$ which are laminated in this order, and the temperatures $T_1$, $T_2$ and $T_3$ satisfy the following inequality: $T_1 < T_3 < T_2$. In the above arrangement, among bits recorded on the recording layer, only the recorded bit which satisfy the following conditions is reproduced: the recorded bit in an area irradiated with a light beam and in an area having a temperature above $T_1$, and outside an area having a temperature above $T_3$. Accordingly, the recorded bits with a size significantly smaller than the area irradiated with the light beam can be reproduced, thereby significantly improving the recording density.

56 Claims, 14 Drawing Sheets

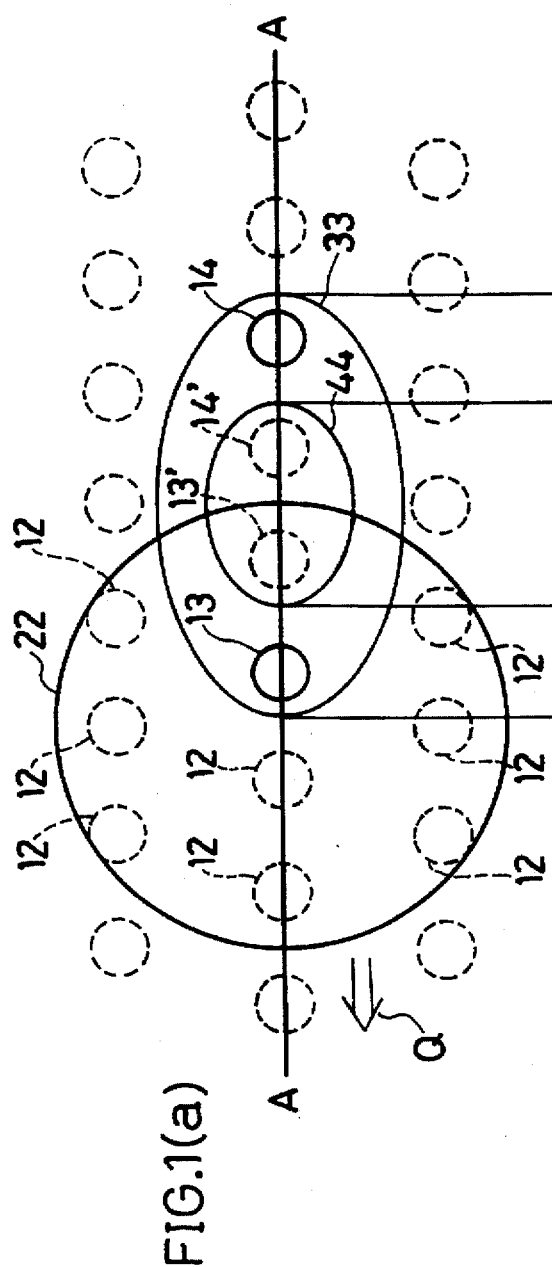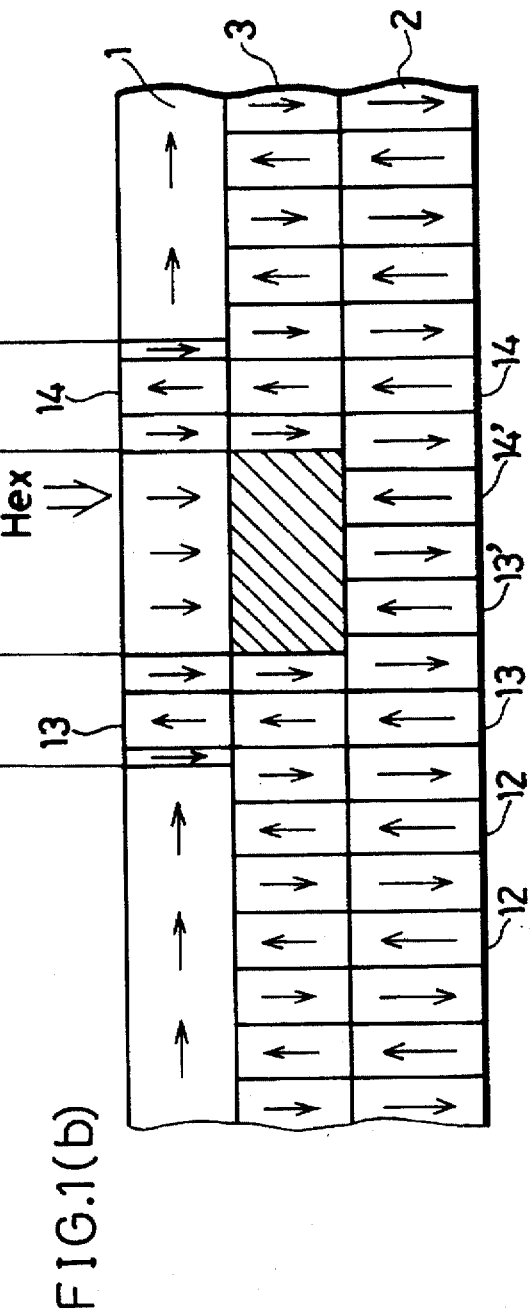
FIG.1(a)
FIG.1(b)

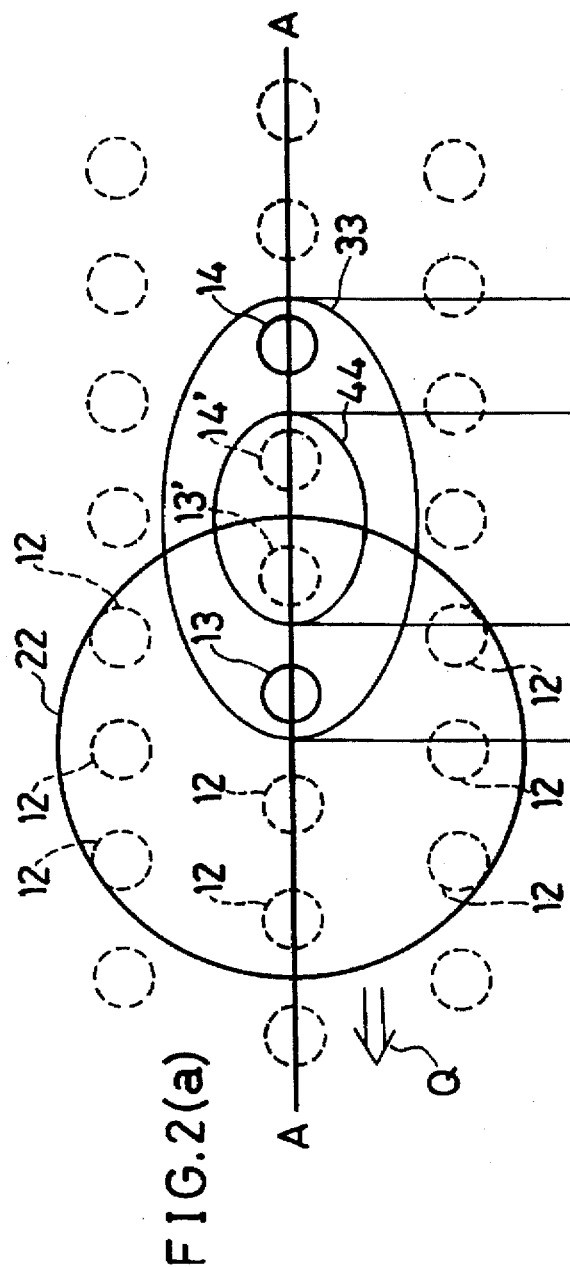
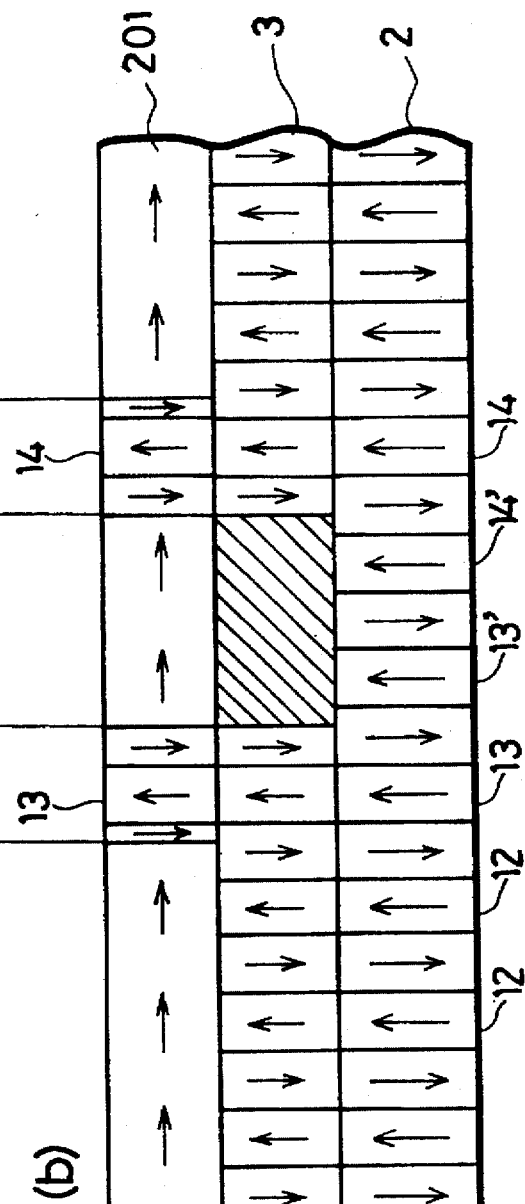
FIG.2(a)
FIG.2(b)

MAGNETO-OPTICAL RECORDING MEDIUM

FIELD OF THE INVENTION

The present invention relates to a magneto-optical recording medium such as a magneto-optical disk, a magneto-optical tape, a magneto-optical card, etc., designed for a magneto-optical recording and reproducing device.

BACKGROUND OF THE INVENTION

Using a magneto-optical recording medium such as a magneto-optical disk which has been practically used as a new recording medium which permits higher recording density compared with the conventional magnetic recording medium on or from which recording and reproducing are carried out using a magnetic head, research and development have been earnestly made in pursuit of still higher recording density.

The recording density on the magneto-optical recording medium is determined by the size of the light beam used in recording and reproducing. More specifically, when the recording bit diameter and the recording bits interval are smaller than the spot diameter of the light beam to be converged onto the magneto-optical recording medium, a plurality of recording bits exist in the spot of the light beam, thereby presenting the problem that the recording bits cannot be reproduced separately.

In order to counteract the above defect of the magneto-optical recording medium, a super resolution magneto-optical disk has been proposed on which a recording bit with a size smaller than the light beam can be recorded (Kaneko et al.: Super Resolution Magneto-Optical Disk, magazine of Japan Applied Magnetic Society, Vol. 15, No. 5, 1991).

In the super resolution magneto-optical disk, by utilizing the temperature distribution of the light beam projected onto the disk, a mask is effectively formed in the disk, so that only a particular portion having a temperature rise above predetermined temperature is subjected to reproduction. The super resolution magneto-optical disk is provided with an exchange-coupled doublelayer film composed of a readout layer and a recording layer which are magnetic thin films with perpendicular magnetization.

In the case of reproducing information from the super resolution magneto-optical disk, first an initializing subsidiary magnetic field generated from the subsidiary magnetic field generating device is applied onto the readout layer, and further, it is required to initialize the readout layer so that the magnetization direction in the readout layer is arranged in a predetermined direction. Moreover, when a reproduction-use light beam is projected onto the super resolution magneto-optical disk, the temperature of the disk is partially raised, whereby the information in the form of magnetization direction recorded on the recording layer is copied to the readout layer in a high temperature area 83. Additionally, the light spot 72 is shifted in the direction of an arrow P with respect to the disk, and thus high temperature area 83 is slightly displaced backward from the center of the light spot 72. Therefore, among information recorded on the disk, only information 63 recorded in the high temperature area 83 of the light spot 72 is reproduced. As described, since the high temperature area 83 in the light spot 72 serves as an optical aperture, effective light spot subjected to reproduction can be made smaller, thereby improving the reproducing resolution.

However, when the magneto-optical disk is used, prior to the reproducing operation, the initializing subsidiary magnetic field generated from the subsidiary magnetic field generating device must be applied. Moreover, in reproducing, information copied from the recording layer to the readout layer remains as it is even after the temperature of the portion has dropped. Thus, when the spot of the light beam is shifted so as to reproduce the next recording bits, the recording bit previously reproduced still exist within the light beam, thereby presenting the problem that the remaining bit is also reproduced, which is the cause of generating noise, thereby hindering an improvement in the recording density.

Additionally, the method of overwriting at high density by the light intensity modulation using a super resolution magneto-optical disk which is composed of seven magnetic layers in lieu of the conventional recording medium which is composed of a recording layer, an intermediate layer, a writing layer, a switching layer and an initialization layer has been proposed. (Fujii et al.: Direct Overwriting and super Resolution Readout by Exchange-Coupled multilayer Film, Proceedings of Magneto-Optical Recording international Symposium '92, J Magn. Soc. Jpn. Vol. 17, Supplement No. S1 (1993), pp. 167–170).

However, the above recording medium designed for overwriting by the light intensity modulation has a complicated structure by being composed of seven magnetic layers.

As shown in FIG. 15, in the conventional super resolution magneto-optical disk and the recording medium for overwriting by the light intensity modulation, if the recording density is increased twice as high as the conventional disk, in the high temperature area 83 of the light beam spot 72, two pieces of information 93, 93' exist, thereby presenting the problem that the respective two pieces of information cannot be reproduced separately.

If the reproducing resolution is raised in order to achieve a higher density recording, the following problems arise: In the case of the magneto-optical disk, as track pitch is set narrower, and a bit interval is set smaller so as to increase the linear recording density, effects from the thermal interference to the adjoining tracks in recording and thermal interaction between the adjoining recording bits cannot be avoided. This is because the principle of magneto-optical recording is such that the reduction in the coercive force as the temperature rise of the magnetic substance by the projection of the light beam is utilized.

Namely, when the truck pitch is made narrower so as to set the trucks close to one another, the temperature rise in the recording truck when recording also affects the information bit string already recorded in the adjoining trucks by the thermal diffusion in a transverse direction, thereby presenting the problem that the state of magnetization in the portion is disturbed. Moreover, when the bit interval is set smaller, the effect from the thermal interference between the successive recording bits cannot be avoided also in the truck direction, thereby presenting the problem that the state of magnetization in the recording bit already recorded as described above is disturbed. Therefore, the techniques for the recording compensation so as to design the shape of the recording pulse is required, thereby increasing the load on the device system side.

SUMMARY OF THE INVENTION

An object of the present invention is to provide a magneto-optical recording medium which does not require an initialization magnetic field in reproducing information and has a simplified magnetic film structure, and which has an improved reproducing resolution compared with the conventional magneto-optical recording medium, thereby achieving an improvement in the recording density.

Another object of the present invention is to provide a magneto-optical recording medium which permits an improvement in the recording density by eliminating an adverse effect due to a thermal interference to the adjacent recording bits in recording, which has been the problem in achieving a high density magneto-optical recording.

In order to achieve the above object, the magneto-optical recording medium of the present invention is characterized in comprising:

a readout layer which has in-plane magnetization at room temperature, and in which a transition occurs from in-plane magnetization to perpendicular magnetization when temperature of a portion irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has perpendicular magnetization at room temperature, the perpendicular magnetization being maintained in a range of room temperature—Curie temperature $T_3$, and wherein the temperatures $T_1$, $T_2$ and $T_3$ satisfy the following inequality:

$$T_1 < T_3 < T_2.$$

In the above arrangement, a recording of information is carried out by projecting a light beam on the magneto-optical recording medium, while a recording magnetic field is being applied thereon so as to raise the temperature of the recording layer to the vicinity of the Curie temperature $T_2$. As a result, the magnetization direction in the recording layer is reversed, thereby forming a recording bit on the recording layer.

When a light beam is projected onto the magneto-optical recording medium, the temperature distribution of the portion irradiated with a light beam shows a Gaussian distribution. Therefore, the portion having a temperature above $T_1$ is smaller than the portion irradiated with a light beam. Furthermore, the portion having a temperature above $T_3$ is still smaller than the area having a temperature $T_1$.

In reproducing information, as a light beam is moved at a predetermined linear velocity with respect to the magneto-optical recording medium, the portion having the highest temperature of the magneto-optical recording medium is slightly displaced backward from the center of the light beam. Therefore, a portion of the area having a temperature above $T_1$ (and a portion of an area having a temperature above $T_3$) exists within the area irradiated with the light beam, and the recording bit recorded within the area having a temperature above $T_1$ but outside the area irradiated with the light beam is not reproduced.

Other than the portion having a temperature above $T_1$, in-plane magnetization is maintained in the readout layer, and the magneto-optical effect (polar Kerr effect) is now shown with respect to a perpendicular incident light. Therefore, information recorded within the area irradiated with a light beam but outside the area having a temperature above $T_1$ is not reproduced.

In the intermediate layer, the magnetization disappears from the area having a temperature above and the perpendicular magnetization appears in other portion. On the other hand, in the readout layer, perpendicular magnetization appears in an area having a temperature rise above $T_1$, whereas has in-plane magnetization in other portions. Therefore, in the area within the area having a temperature above $T_1$ but outside the area having a temperature above $T_3$, the information in the form of magnetization direction recorded on the recording layer is copied to the readout layer by exchange coupling force exerted between the recording layer and the readout layer through the perpendicular magnetization in the intermediate layer provided between the recording layer and the readout layer.

On the other hand, in the area having a temperature above $T_3$ and thus magnetization no longer exists in the intermediate layer, the information in the form of magnetization direction recorded on the recording layer does not exert exchange coupling force toward the readout layer. Thus the magnetization state of the readout layer is mainly determined by the intensity of the perpendicular magnetic anisotropy.

Specifically, in the readout layer having a relatively large perpendicular magnetic anisotropy, the perpendicular magnetization appears even in the portion corresponding to the area where the magnetization does not exist of the intermediate layer (the area having a temperature above $T_3$). In this case, with the application of the external magnetic field in reproducing, the magnetization direction in the portion corresponding to the area having a temperature above $T_3$ of the readout layer is arranged in the direction of the external magnetic field. Thus, the recording bit recorded in the area having a temperature above $T_3$ is not reproduced.

On the other hand, in the readout layer having a relatively small perpendicular magnetic anisotropy, in-plane magnetization appears in the area corresponding to the area in which magnetization no longer exists in the intermediate layer (the area having a temperature above $T_3$), and the magneto-optical effect is not shown with respect to the perpendicular incident light. Thus, the recording bit recorded within the area having a temperature above $T_3$ is not reproduced. In this case, an application of the external magnetic field is not required.

In the above arrangement, the only information to be reproduced with the application of the light beam is the information recorded within the area irradiated with the light beam and within the area having a temperature above $T_1$ but outside the area having a temperature above $T_3$. Therefore, the magneto-optical recording medium having the above arrangement permits an improvement in the reproducing resolution, thereby achieving an improvement in the recording density. Moreover, the magneto-optical recording medium does not required the initializing magnetic field in reproducing information and has a simplified magnetic film structure (exchange-coupled triplilayer film).

In order to achieve the above object, the magneto-optical recording medium of the present invention is characterized in comprising:

a readout layer which has in-plane magnetization at room temperature, and in which a transition occurs from in-plane magnetization to perpendicular magnetization when temperature of a portion irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and said recording layer, which has perpendicular magnetization at room temperature, and in which a transition occurs from perpendicular magnetization to in-plane magnetization at temperature above $T_3$, and wherein the temperatures $T_1$, $T_2$ and $T_3$ satisfy the following inequality:

$$T_1 < T_3 < T_2.$$

In the above arrangement, when a light beam is projected onto the magneto-optical recording medium for reproducing information, a transition occurs in the intermediate layer from perpendicular magnetization to the in-plane magnetization in the area having a temperature above $T_3$, and in which the perpendicular magnetization is maintained outside the area having a temperature above $T_3$. On the other hand, the readout layer has perpendicular magnetization in the area having a temperature above $T_1$, and has in-plane magnetization in other portions. Therefore, within the area having a temperature above $T_1$ but outside the area having a temperature above $T_3$, the information in the form of magnetization direction recorded on the recording layer is copied to the readout layer by exchange coupling force exerted between the recording layer and the readout layer through the perpendicular magnetization in the intermediate layer formed between the recording layer and the readout layer.

On the other hand, in the area corresponding to the area having a temperature above $T_3$ and has in-plane magnetization in the intermediate layer, the exchange coupling force exerted between the recording layer and the readout layer through the intermediate layer becomes extremely small. Thus, the magnetization state of the readout layer is determined mainly by the intensity of the perpendicular magnetic anisotropy.

Specifically, in the readout layer having a relatively large perpendicular magnetic anisotropy, the perpendicular magnetization is maintained even in the area having extremely small exchange coupling force exerted from the recording layer through the intermediate layer (the area having a temperature rise above $T_3$), and the magnetization direction thereof is thus arranged in the magnetization direction in the recording layer. However, since the exchange coupling force exerted between the recording layer and the readout layer is extremely small, by applying the external magnetic field of an appropriate intensity onto the readout layer, the magnetization direction in the area having a temperature rise above $T_3$ of the readout layer can be arranged in one direction. Here, the information in the form of the magnetization direction copied from the recording layer is stored in the readout layer, thereby reproducing the information recorded in the area having a temperature rise above $T_3$.

On the other hand, in the readout layer having a relatively small perpendicular magnetic anisotropy, the area having an extremely small exchange coupling force exerted from the recording layer through the intermediate layer (the area having a temperature rise above $T_3$) has in-plane magnetization, and the magneto-optical effect is not shown in the area with respect to the perpendicular incident light. Thus, the recording bit recorded within the area having a temperature rise above $T_3$ is not reproduced. In this case, an application of the external magnetic field is not required.

In the above arrangement, the only information to be reproduced with the application of the light beam is the information recorded within the area irradiated with the light beam and within the area having a temperature above $T_1$ but outside the area having a temperature above $T_3$. Therefore, the magneto-optical recording medium having the above arrangement permits an improvement in the reproducing resolution, thereby achieving an improvement in the recording density.

In order to achieve the above object, another magneto-optical recording medium of the present invention is characterized by comprising:

a readout layer which has in-plane magnetization at room temperature, and in which a transition occurs from in-plane magnetization to perpendicular magnetization when temperature of a portion irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has in-plane magnetization at room temperature, the in-plane magnetization being maintained in a range of room temperature—Curie temperature $T_3$, and wherein the temperatures $T_1$, $T_2$ and $T_3$ satisfy the following inequality:

$$T_1 < T_3 < T_2.$$

In the above arrangement, in reproducing information, when a light beam is projected on the magneto-optical recording medium, the magnetization disappears from the area having a temperature above $T_3$ of the intermediate layer, and the intermediate layer has in-plane magnetization in other portions than the above area. On the other hand, the readout layer has perpendicular magnetization in an area having a temperature above whereas, has in-plane magnetization in other portions than the above area. Therefore, in the area within the area having a temperature above $T_1$ but outside the area having a temperature above $T_3$, the information in the form of magnetization direction recorded on the recording layer is copied to the readout layer by the exchange coupling force exerted between the recording layer and the readout layer through the in-plane magnetization in the intermediate layer formed between the recording layer and the readout layer.

On the other hand, in the area having a temperature above $T_3$ and thus magnetization no longer exists, the information in the form of magnetization direction recorded on the recording layer does not exert exchange coupling force toward the readout layer. Thus the magnetization state of the readout layer is mainly determined by the intensity of the perpendicular magnetic anisotropy.

Specifically, the readout layer having a relatively large perpendicular magnetic anisotropy has perpendicular magnetization even in the area corresponding to the area wherein magnetization no longer exists in the intermediate layer. In this case, with the application of the external magnetic field in reproducing, the magnetization direction in the area corresponding to the area having a temperature above $T_3$ of the readout layer is arranged in the direction of the external magnetic field. Thus, the recording bit recorded in the area having a temperature above $T_3$ is not reproduced.

On the other hand, in the readout layer having a relatively small perpendicular magnetic anisotropy, in-plane magnetization appears in the area corresponding to the area in which magnetization no longer exists in the intermediate layer (the area having a temperature above $T_3$), and the magneto-optical effect is not shown with respect to the perpendicular incident light. Thus, the recording bit recorded within the area having a temperature above $T_3$ is not reproduced. In this case, an application of the external magnetic field is not required.

In the above arrangement, the only information to be reproduced with the application of the light beam is the information recorded within the area irradiated with the light beam and within the area having a temperature above $T_1$ but outside the area having a temperature above $T_3$. Therefore, the magneto-optical recording medium having the above arrangement permits an improvement in the reproducing resolution, thereby achieving an improvement in the recording density.

In order to achieve the above object, another magneto-optical recording medium of the present invention is characterized by comprising:

a first magnetic layer which has perpendicular magnetization at room temperature, the perpendicular magnetization being maintained in a range of room temperature—Curie temperature;

a second magnetic layer which has perpendicular magnetization at room temperature, the perpendicular magnetization being maintained in a range of room temperature—Curie temperature that is lower than the Curie temperature of the first magnetic layer; and a third magnetic layer which has in-plane magnetization at room temperature, and in which a transition occurs from in-plane magnetization to perpendicular magnetization at a temperature higher than a second magnetic layer magnetization reversing temperature at which the magnetization direction in the second magnetic layer is reversed by projecting thereon a light beam in the presence of an external magnetic field.

In the above arrangement, information recording, i.e., the formation of the magnetic domain to be a recording bit is carried out in the following manner: first, by projecting a light beam in the presence of the external magnetic field, the magnetization direction in the second magnetic layer whose Curie temperature is set lower than that of the first magnetic layer is reversed. As the temperature of the area irradiated with the light beam is raised, the intensity of the coercive force and the magnetic moment of the second magnetic layer becomes smaller. Then, the reversing of the magnetization occurs in the second magnetic layer when the intensity of the coercive force and the magnetic moment balance with the intensity of the externally applied magnetic field. Here, the magnetization reversing area of the second magnetic layer is the area having a temperature raised above a threshold temperature (reversing temperature).

According to the above arrangement, the recording bit formed on the second magnetic layer by reversing the magnetization is finally copied and recorded magnetically on the first magnetic layer by exchange coupling force exerted thereto through the third magnetic layer. The magnetic copying of the recording bits is carried out between the second magnetic layer and the first magnetic layer only in the area corresponding to the area which has perpendicular magnetization in the third magnetic layer. This is because in the area which has in-plane magnetization in the third magnetic layer, since exchange coupling force exerted between the first magnetic layer and the second magnetic layer becomes extremely weak, the magnetization in the second magnetic layer is not copied to the first magnetic layer.

Here, since the temperature at which transition occurs in the third magnetic layer from in-plane magnetization to perpendicular magnetization is set higher than the second magnetic layer reversing temperature, the area which has perpendicular magnetization in the third magnetic layer is smaller than the magnetization reversing area of the second magnetic layer. Therefore, the recording bit with a size smaller than the recording bit formed on the second magnetic layer is formed on the first magnetic layer.

In the first step of recording information, i.e., the magnetization reversing of the second magnetic layer, a thermal interference occurs to the adjacent bits formed on the same track or adjacent tracks due to a thermal diffusion, and the magnetization of the bits already recorded on the second magnetic layer may be disturbed.

However, in the arrangement of the present embodiment, the portion where the magnetization state is disturbed of the second magnetic layer is masked by the in-plane magnetization in the third magnetic layer, and thus the disturbed magnetization is not copied magnetically onto the first magnetic layer. In recording on the magneto-optical recording medium of the present embodiment, adverse effects to the adjacent bits due to a thermal interference can be avoided even if with a narrower track pitch, or smaller recording bit interval, thereby achieving a significant improvement in the recording density.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) and FIG. 1(b) are explanatory views which show the state in reproducing information of a magneto-optical disk in accordance with the embodiment 1 of the present invention, wherein FIG. 1(a) is a view of the magneto-optical disk from the laser beam projecting side; and FIG. 1(b) is a cross-sectional view taken on the line A—A of FIG. 1(a).

FIG. 2(a) and FIG. 2(b) are explanatory views which show the state in reproducing information of a magneto-optical disk in accordance with the embodiment 2 of the present invention, wherein FIG. 2(a) is a view of the magneto-optical disk from the laser beam projecting side; and FIG. 2(b) is a cross-sectional view taken on the line A—A of FIG. 2(a).

FIG. 3(a) and FIG. 3(b) are explanatory views which show the state in reproducing information of a magneto-optical disk in accordance with the embodiment 3 of the present invention, wherein FIG. 3(a) is a view of the magneto-optical disk from the laser beam projecting side; and FIG. 3(b) is a cross-sectional view taken on the line A—A of FIG. 3(a).

FIG. 4(a) and FIG. 4(b) are explanatory views which show the state in reproducing information of a magneto-optical disk in accordance with the embodiment 4 of the present invention, wherein FIG. 4(a) is a view of the magneto-optical disk from the laser beam projecting side; and FIG. 4(b) is a cross-sectional view taken on the line A—A of FIG. 4(a).

FIG. 5(a) and FIG. 5(b) are explanatory views which show the state in reproducing information of a magneto-optical disk in accordance with the embodiment 5 of the present invention, wherein FIG. 5(a) is a view of the magneto-optical disk from the laser beam projecting side; and FIG. 5(b) is a cross-sectional view taken on the line A—A of FIG. 5(a).

FIG. 6(a) and FIG. 6(b) are explanatory views which show the state in reproducing information of a magneto-optical disk in accordance with the embodiment 6 of the present invention, wherein FIG. 6(a) is a view of the magneto-optical disk from the laser beam projecting side; and FIG. 6(b) is a cross-sectional view taken on the line A—A of FIG. 6(a).

FIG. 11 is a graph showing temperature dependencies of respective coercive forces of $Gd_{0.10}Dy_{0.13}Fe_{0.54}Co_{0.23}$ and $Tb_{0.20}Fe_{0.75}Co_{0.05}$.

DESCRIPTION OF THE EMBODIMENTS

[EMBODIMENT 1]

The following description will discuss the first embodiment of the present invention with reference to FIG. 1(a), FIG. 1(b), FIG. 7 and FIG. 8.

Figure 7:
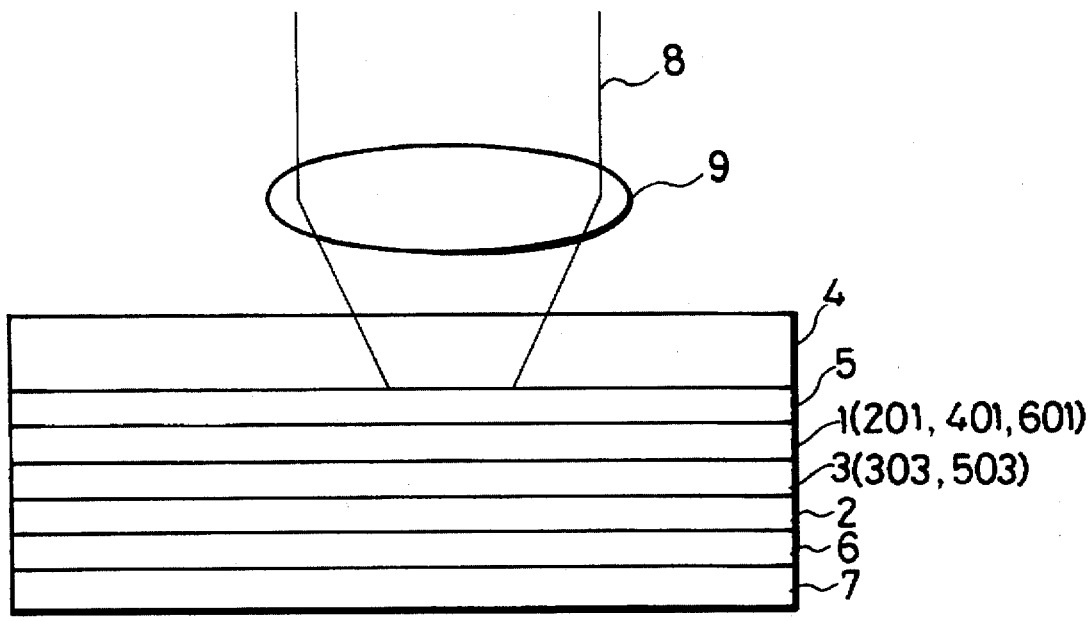
FIG. 7 is an explanatory view showing the configuration of the magneto-optical disk of the embodiments 1–6.

As shown in FIG. 7, the magneto-optical disk (magneto-optical recording medium) of the present embodiment is composed of a transparent substrate 4 whereon a first transparent dielectric layer 5, a readout layer 1, an intermediate layer 3, a recording layer 2, a second transparent dielectric layer 6 and an overcoat layer 7 are laminated in this order.

Figure 8:
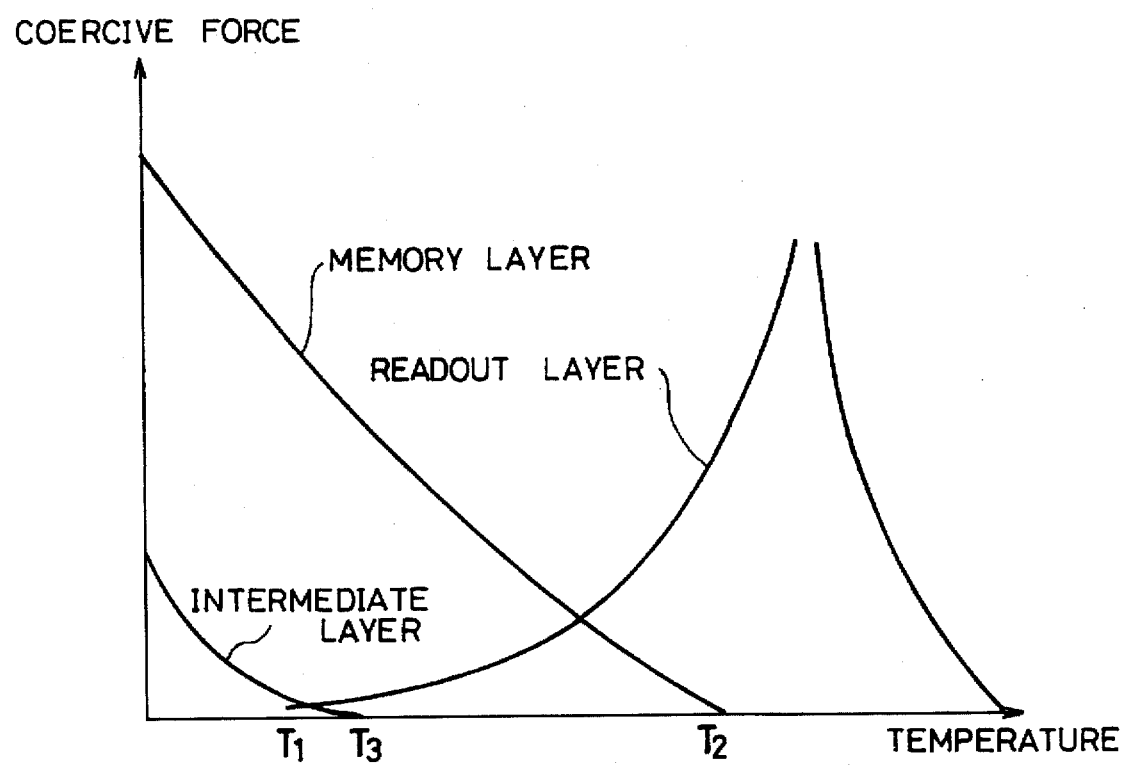
FIG. 8 is a graph showing the temperature dependency of the coercive force of each magnetic layer of the magneto-optical disk of the embodiments 1–6.

The readout layer 1 has in-plane magnetization at room temperature, and a transition occurs from in-plane magnetization to perpendicular magnetization at temperature above $T_1$ (see FIG. 8). As to the material for the readout layer 1, rare-earth transition metal is preferable.

Here, temperature dependency of the magnetic moments of the rare-earth metal and the transition metal are respectively different from one another. Specifically, at high temperature, the magnetic moment of the transition metal is greater than that of the rare-earth metal. Therefore, in order to obtain the readout layer 1 made of the rare-earth transition metal which has the above-mentioned properties, the content of the rare-earth metal is set greater than that in the compensating composition at room temperature where the magnetic moment of the rear-earth metal and that of the transition metal, balance with one another. The readout layer 1 thus manufactured does not exhibit perpendicular magnetization but has in-plane magnetization at room temperature, and a transition occurs from in-plane magnetization to perpendicular magnetization at temperature above $T_1$. When the temperature of the area irradiated with the light beam is raised above $T_1$, the magnetic moment of the transition metal becomes relatively greater until it balances with that of the rare-earth metal and the readout layer 1 has perpendicular magnetization as a whole.

The readout layer 1 shows relatively large perpendicular magnetic anisotropy. As to the material for the readout layer 1, for example, $Dy_{0.35}(Fe_{0.5}Co_{0.5})_{0.65}$ with a thickness of 50 nm may be used. Here, $T_1$, at which transition occurs in the readout layer 1 from in-plane magnetization to perpendicular magnetization, is preferably set within a range of 40°–70° C.

The intermediate layer 3 has perpendicular magnetization at room temperature, and the perpendicular magnetization remains from room temperature to Curie temperature $T_3$ (see FIG. 8). The Curie temperature $T_3$ of the intermediate layer 3 is set higher than $T_1$ at which transition occurs in the readout layer 1 from in-plane magnetization to perpendicular magnetization ($T_1 < T_3$). As to the material for the intermediate layer 3, for example, $Ho_{0.28}(Fe_{0.85}Co_{0.15})_{0.72}$ with a thickness of 50 nm, $Dy_{0.21}Fe_{0.79}$ with a thickness of 50 nm, etc., may be used. The Curie temperature $T_3$ of the intermediate layer 3 is preferably set within a range of 60°–90° C.

The recording layer 2 has perpendicular magnetization at room temperature, and the perpendicular magnetization remains from room temperature to Curie temperature $T_2$. The Curie temperature $T_2$ of the recording layer 2 is set higher than the Curie temperature $T_3$ of the intermediate layer 3 ($T_3 < T_2$). Therefore, $T_1$, $T_2$ and $T_3$ satisfy the following inequality:

$$T_1 < T_3 < T_2.$$

For the recording layer 2, $Dy_{0.23}(Fe_{0.82}Co_{0.18})_{0.77}$ with a thickness of 50 nm may be used. The Curie temperature $T_2$ of the recording layer 2 is preferably set within a range of 120°–180° C.

The first transparent dielectric layer 5 contributes to improve the reproducing function. Specifically, it serves to enhance the magnetic Kerr rotation angle by its anti-reflection function. As to the material for the first transparent dielectric layer 5, AlN, SiN, AlSiN, AlSiON, $TiO_2$, etc., may be used. The thickness of the layer is set substantially the value obtained by dividing a quarter of a reproducing wavelength by a refractive index. For example, when the light beam with the wavelength of 800 nm is employed for reproducing, the layer thickness of the first transparent dielectric layer 5 is in the range of 10–80 nm. The second transparent dielectric layer 6 serves as a protective layer made of nitride such as AlN, etc., with a thickness of 50 nm.

When recording on the magneto-optical disk having the above arrangement, first, recording magnetic field is applied onto the magneto-optical disk, and the laser beam 8 of high power is converged onto the magneto-optical disk through the objective lens 9 so as to raise the temperature of the recording layer 2 to the vicinity of Curie temperature $T_2$, thereby forming a recording bit on the recording layer 2.

Next, the reproducing process will be described below with reference to FIGS. 1(a) and (b). FIG. 1(a) is a view of the magneto-optical disk from the laser beam 8 projecting side. FIG. 1(b) is a cross-sectional view taken on the line A—A of FIG. 1(a), which shows respective magnetization states of the readout layer 1, the recording layer 2 and the intermediate layer 3.

First, a laser beam 8 with a lower power than that used in recording is projected onto the magneto-optical disk (see FIG. 7). The laser beam 8 moves with respect to the magneto-optical disk in the direction of arrow Q, and the portion on the magneto-optical disk, having the highest temperature is slightly displaced backward from the center of the light spot. Therefore, the area 33 having the temperature rise above $T_1$ of the readout layer 1 by the projection of the laser beam 8 is slightly displaced backward from the area 22 irradiated with the laser beam 8. The area 44 in which the temperature of the intermediate layer 3 is raised above Curie temperature $T_3$ is slightly displaced backward from the area 22 irradiated with the laser beam 8.

In the area 44 having a temperature above Curie temperature $T_3$, the magnetization in the intermediate layer 3 disappears. On the other hand, other portions of the intermediate layer 3 has perpendicular magnetization. As a result, the magnetization in the recording layer 2 is copied to the intermediate layer 3 by the exchange coupling force exerted between the recording layer 2 and the intermediate layer 3.

The readout layer 1 has perpendicular magnetization in the area 33 having a temperature above $T_1$, and other portions of the readout layer 1 has in-plane magnetization. Here, within the area 33 but outside the area 44 of the readout layer 1, the magnetization direction in the intermediate layer 3 is copied to the readout layer 1 by the exchange coupling force exerted between the intermediate layer 3 and the readout layer 1. Specifically, the information in the form of magnetization direction in the recording layer 2 is copied to the readout layer 1 through the magnetization in the intermediate layer 3. The magnetization direction in the readout layer 1 within the area 33 but outside the area 44 becomes identical with the magnetization direction in the recording layer 2.

As described, the information recorded on the recording layer 2 in the form of magnetization direction is copied to the readout layer 1 through the magnetization in the intermediate layer 3. Thus, in the area having a temperature rise above Curie temperature $T_3$ of the intermediate layer 3, and thus the magnetization in the intermediate layer disappears, the exchange coupling force is not exerted between the readout layer 1 and the recording layer 2. Therefore, in the area corresponding to the area 44 of the readout layer 1 is in a free state without having an effect of the exchange coupling force exerted from the intermediate layer 3, and the magnetization state in the area 44 of the readout layer 1 is determined by the property of the readout layer 1, i.e., the intensity of the perpendicular magnetic anisotropy.

The readout layer 1 of the present embodiment has relatively large perpendicular magnetic anisotropy. Therefore, even in the area 44 of the readout layer 1 having no exchange coupled force exerted from the intermediate layer 3, the perpendicular magnetization can be maintained. Therefore, in the present embodiment, when reproducing, in order to always arrange the magnetization in the readout layer 1 corresponding to the area 44 in one direction, an external magnetic field Hex must be applied to the magneto-optical disk. As a result, recording bits 13' and 14' recorded in the area 44 having a temperature above $T_3$ are not reproduced.

As described, when the reproducing process is carried out, the portion having the highest temperature of the magneto-optical disk is slightly displaced backward from the center of the center of the laser beam 8. Therefore, the area 22 irradiated with the laser beam 8 includes a portion of the area 33 with a temperature above $T_1$ at which a transition occurs in the readout layer 1 from in-plane magnetization to perpendicular magnetization and a portion of the area 44 having a temperature above Curie temperature $T_3$ of the intermediate layer 3. Therefore, recording bits 14 and 14' recorded within the area 33 but outside the area 22 irradiated with the laser beam 8 are not reproduced.

In-plane magnetization is maintained outside the area 33 of the readout layer 1, and thus the magneto-optical effect does not occur with respect to a perpendicular incident light. Therefore, bits 12 recorded within the area 22 irradiated with the laser beam 8 but outside the area 33 having a temperature above $T_1$ are not reproduced.

As described, the only recording bits to be reproduced with the application of the laser beam 8 are the recording bits 13 recorded within the area 22 irradiated with the laser beam 8 and within the area 33 having a temperature above $T_1$ at which a transition occurs in the readout layer 1 from in-plane magnetization to perpendicular magnetization but outside the area 44 of the intermediate layer 3 having a temperature above $T_3$. Therefore, the magneto-optical disk of the present embodiment permits recorded bits with a size smaller than that of the conventional magneto-optical recording medium to be separately reproduced, thereby achieving a significant improvement in the recording density.

When reproducing the next recorded bit with a shift of the laser beam 8, the temperature of the portion previously irradiated with the laser beam 8 drops, and a transition occurs in the portion of the readout layer 1 from the perpendicular magnetization to the in-plane magnetization. Accordingly, in the portion having a temperature drop, a magnetic Kerr effect is no more effective. As a result, information recorded on the portion is not reproduced, thereby preventing the entering of the signal from adjacent bits, which is the cause of the generation of noise.

The following will discuss the present embodiment in more detail. First, the manufacturing process of the magneto-optical disk is explained below.

In a sputtering device provided with Al, Gd, Dy, Ho, Fe and Co targets, a transparent disk substrate 4 made of polycarbonate having grooves and pits formed beforehand was placed so as to confront the targets. After carrying out the air-evacuation in the sputtering device to $1\times10^{-6}$ Torr, mixed gas of argon and nitrogen was introduced into the unit. Then, a power was supplied to the Al target, and a sputter evaporation was carried out under the conditions of the gas pressure of $4\times10^{31\ 3}$ Torr and the sputter speed 12 nm/min, thereby forming the first transparent dielectric layer 5 made of AlN on the disk substrate 4. As described, the first transparent dielectric layer 5 contributes to improve the reproducing ability, the thickness of the layer 5 was set substantially the value obtained by dividing a quarter of a reproducing light wavelength by a refractive index. In the present embodiment, a light beam with the wavelength of 800 nm is employed for reproducing, thus the layer thickness of the first transparent dielectric layer 5 is set 60 nm.

Next, the air evacuation was carried out again in the sputtering device to $1\times10^{-6}$ Torr, and argon gas is introduced into the device. Then, a power is supplied to the Dy, Fe and Co targets, and a sputter evaporation is carried out under the conditions of the gas pressure of $4\times10^{-3}$ Torr and the sputter speed 15 nm/min, thereby forming the readout layer 1 made of $Dy_{0.35}(Fe_{0.5}Co_{0.5})_{0.65}$ with a thickness of 50 nm on the first transparent dielectric layer 5. The read-out layer 1 exhibited an in-plane magnetization at room temperature, and a transition occurred to a perpendicular magnetization at temperature above 60° C. ($T_1$=60° C). Here, the Curie temperature of the readout layer 1 is 320° C.

Next, the power supply to Dy target was stopped, and the power was supplied to Ho target. Then, a sputter evaporation was carried out under the same conditions as the above case of forming the readout layer 1, thereby forming the intermediate layer 3 made of $Ho_{0.28}(Fe_{0.85}Co_{0.15})_{0.72}$ with thickness of 50 nm on the readout layer 1. The intermediate layer 3 was a magnetic thin film with perpendicular magnetization whose Curie temperature $T_3$ was 90° C.

Next, the power supply to Ho target was stopped, and the power was supplied to Dy target. Then, a sputter evaporation is carried out under the same conditions as the above case of forming the readout layer 1, thereby forming the recording layer 2 made of $Dy_{0.23}(Fe_{0.82}Co_{0.18})_{0.77}$ with thickness of 50 nm on the intermediate layer 3. The recording layer 2 was a magnetic thin film with perpendicular magnetization having a compensating point at room temperature. Here, Curie temperature $T_2$ of the recording layer 2 was 160° C.

Next, mixed gas of argon and nitrogen was introduced into the sputtering device. Then, a power was supplied to the Al target, and a sputter evaporation was carried out under the conditions of the gas pressure of $4 \times 10^{-3}$ Torr and the sputter speed 12 nm/min, thereby forming the second transparent dielectric layer 6 made of AlN on the recording layer 2. As to the thickness of the second transparent dielectric layer 6, it was only required to be sufficient for protecting the above magnetic layers (the recording layer 2, the intermediate layer 3 and the readout layer 1) from corrosion due to oxidation. In the present embodiment, it was set 50 nm.

Thereafter, the disk substrate 4 having the above layers laminated was taken out of the sputtering device. Then, the second transparent dielectric layer 6 was coated with an ultraviolet hardening resin using a spin coat method. Thereafter, ultraviolet ray was projected thereon so as to form the overcoat layer 7 on the second transparent dielectric layer 6. Here, a heat-hardening resin may be used as well for an overcoat layer 7.

The laser beam 8 was converged onto the magneto-optical disk thus manufactured by the objective lens 9, and the disk is rotated at 10 m/s relative linear velocity with respect to the laser beam 8. While the laser beam 8 of 10 mW was being successively projected onto the disk for recording, the modulation magnetic field of ±15 kA/m was applied onto the magneto-optical disk after modulating it at 10 MHz frequency, a reverse magnetic domain with a length of 0.5 µm at 1 µm frequency (interval) was formed on the recording layer 2.

Thereafter, the power of the laser beam 8 was reduced to 2 mW while a constant magnetic field of +5 kA/m (an external magnetic field Hex) is being applied so as to reproduce the recorded information. Then, the reproduction signal with 10 MHz frequency was obtained from the readout layer 1, according to the reverse magnetic domain formed on the recording layer 2.

On the other hand, while the laser beam 8 of 10 mW was being successively projected onto the disk for recording, the modulation magnetic field of ±15 kA/m was applied onto the magneto-optical disk after modulating it at 20 MHz frequency, a reverse magnetic domain with 0.25 µm length at 0.5 µm period (interval) was formed on the recording layer 2.

Thereafter, the power of the laser beam 8 was reduced to 2 mW while a constant-magnetic field of +5 kA/m (an external magnetic field Hex) is being applied so as to reproduce the recorded information. Then, the reproduction signal with 20 MHz frequency was obtained from the readout layer 1, according to the reverse magnetic domain formed on the recording layer 2.

As a comparison example of embodiment 1, using the magneto-optical disk having the same configuration as that of embodiment 1 except that the intermediate layer 3 was not provided, recording and reproducing operations were carried out in the same manner as the embodiment 1. When a recording operation was carried out with 10 MHz frequency, a reproduction signal of 10 MHz frequency was obtained as in the case of embodiment 1. However, when a reproducing operation was carried out with 20 MHz, a recorded information could not be separated from the adjacent recorded information. As a result, the reproduction signal with 20 MHz frequency was not obtained.

As described, the magneto-optical recording medium of the present invention comprises:

a readout layer which has in-plane magnetization at room temperature, and in which a transition occurs from in-plane magnetization to perpendicular magnetization when temperature of a portion irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has perpendicular magnetization at room temperature, the perpendicular magnetization being maintained in a range of room temperature—Curie temperature $T_3$, wherein the temperatures $T_1$, $T_2$ and $T_3$ satisfy the following inequality:

$$T_1 < T_3 < T_2.$$

According to the above arrangement, by projecting the light beam while an external magnetic field is being applied so as to arrange the magnetization direction in the area having a temperature above $T_3$ of the readout layer in one direction (the magnetization in the intermediate layer disappears, and thus exchange coupling force was not exerted between the intermediate layer and the readout layer), only the bit recorded on the recording layer which satisfy all of the following conditions is subjected to reproduction: 1) the recorded area is within the irradiated area with the light beam; 2) the temperature of the recorded area is above $T_1$; and 3) the temperature of the recorded area is not above $T_3$. Therefore, the magneto-optical recording medium having the above arrangement permits a reproduction of a recorded bit with a size smaller than the size of the irradiated area with the light beam, thereby significantly improving the recording density. Moreover, the magneto-optical recording medium of the present embodiment does not require the initializing magnetic field when reproducing information, and it has a simple structure of exchange-coupled triplilayer.

[EMBODIMENT 2]

The following description will discuss the embodiment 2 of the present invention with reference to FIG. 2(a), FIG. 2(b), FIG. 7 and FIG. 8.

The magneto-optical disk (magneto-optical recording medium) of the present embodiment has the same arrangement as that of the embodiment 1 except that a readout layer 201 is provided in lieu of the readout layer 1 of the embodiment 1. The layers other than the readout layer 1, i.e., the substrate, the first transparent dielectric layer, the intermediate layer, the recording layer, the second transparent dielectric layer and the overcoat layer respectively have the same configurations and properties as those of the embodiment 1. Therefore, the above layers are designated by the same codes as the embodiment 1, and the detailed descriptions thereof shall be omitted here (see FIG. 7).

The readout layer 201 is the same as the readout layer 1 of the embodiment 1 in that it has in-plane magnetization at room temperature, and has perpendicular magnetization at a temperature above $T_1$ (see FIG. 8). However, the readout layer 1 of the embodiment 1 has relatively large perpendicular magnetic anisotropy, whereas, the readout layer 201 of the present embodiment has relatively small perpendicular magnetic anisotropy. Specifically, even if the temperature of the portion irradiated with the light beam of the readout layer 201 is raised above $T_1$, the temperature of the intermediate layer 3 becomes above Curie temperature $T_3$, and the magnetization disappears from the intermediate layer 3. Thus, if exchange-coupling force between the intermediate layer 3 and the readout layer 201 is not exerted, and the readout layer 201 has in-plane magnetization as a whole because of its small perpendicular magnetic anisotropy. As to the material for- the readout layer 201, the rear-earth transition metal wherein the content of the rare-earth metal is set greater than that in the compensating composition at room temperature may be used. In the present embodiment, $Gd_{0.28}(Fe_{0.8}Co_{0.2})_{0.72}$ with a thickness of 50 nm is employed.

$T_1$ at which a transition occurs in the readout layer 201 from in-plane magnetization to perpendicular magnetization is preferably set in a range of 40°–70° C. The Curie temperature $T_3$ of the intermediate layer 3 is preferably set in a range of 60°–90° C. The Curie temperature $T_2$ of the recording layer 2 is preferably set in a range of 120°–180° C. Therefore, $T_1$, $T_2$ and $T_3$ satisfy the following inequality:

$$T_1 < T_3 < T_3.$$

When recording on the magneto-optical disk having the above arrangement, first, recording magnetic field is applied onto the magneto-optical disk, and the laser beam 8 of high power is converged onto the magneto-optical disk through the objective lens 9 so as to raise the temperature of the recording layer 2 to the vicinity of Curie temperature $T_2$, thereby forming a recording bit on the recording layer 2.

Next, the reproducing process will be described below with reference to FIGS. 2(a) and (b). FIG. 2(a) is a view of the magneto-optical disk from the laser beam 8 projecting side. FIG. 2(b) is a cross-sectional view taken on the line A—A of FIG. 2(a), which shows respective magnetization states of the magnetic layers 201, 2 and 3.

First, a laser beam 8 with a lower power than that used in recording is projected onto the magneto-optical disk. The laser beam 8 moves with respect to the magneto-optical disk in the direction of arrow Q, and the area 33 on the magneto-optical disk, having the highest temperature is slightly displaced backward from the center of the light spot. Therefore, the area 33 having the temperature rise above $T_1$ in the readout layer 201 by the projection of the laser beam 8 is slightly displaced backward from the area 22 irradiated with the laser beam 8. The area 44 having a temperature above Curie temperature $T_3$ of the intermediate layer 3 is slightly displaced backward from the area 22 irradiated with the laser beam 8.

As in the case of the embodiment 1, the intermediate layer 3 has perpendicular magnetization in other portions of the area 44, and the magnetization direction in the recording layer 2 is copied to the intermediate layer 3 by exchange coupling force exerted between the recording layer 2 and the intermediate layer 3.

Similarly, within the area 33 but outside the area 44 of the readout layer 201, the information in the form of magnetization direction in the recording layer 2 is copied to the readout layer 201 through the magnetization in the intermediate layer 3. The magnetization direction in the readout layer 201 within the area 33 but outside the area 44 becomes identical with the magnetization direction in the recording layer 2.

The readout layer 201 of the present embodiment has relatively small perpendicular magnetic anisotropy. Therefore, the area 44 of the readout layer 201 wherein exchange coupling force is not exerted from the intermediate layer 3 has in-plane magnetization and does not shows magneto-optical effect with respect to a perpendicular incident light. Therefore, the recording bit 13' and the recording bit 14' recorded on the recording layer 2 are not reproduced by being masked with the in-plane magnetization in the readout layer 201. In the above arrangement of the present embodiment, in producing, the external magnetic field Hex used in the first embodiment for arranging the magnetization direction in the readout layer 201 corresponding to the area 44 in the same direction is not required.

As described, in reproducing, the portion having the highest temperature of the magneto-optical disk is slightly displaced backward from the center of the laser beam 8. Therefore, the area 22 irradiated with the laser beam 8 includes a portion of the area 33 having a temperature above $T_1$ at which a transition occurs in the readout layer 201 from in-plane magnetization to perpendicular magnetization and a portion of the area 44 where the temperature of the intermediate layer 3 is raised above Curie temperature $T_3$. Therefore, the recording bits 14, 14' recorded within the area 33 but outside the area 22 irradiated with the laser beam 8 is not reproduced.

In-plane magnetization is maintained outside the area 33 of the readout layer 201, and thus the magnetic Kerr effect is not shown with respect to a perpendicular incident light. Therefore, the recording bit 12 recorded within the area 22 irradiated with the light beam but outside the area 33 having a temperature above $T_1$ is not reproduced.

As described, the only information to be reproduced with the application of the laser beam 8 is the recording bit 13 recorded within the area 22 irradiated with the laser beam 8 and within the area 33 having a temperature above $T_1$ at which a transition occurs from in-plane magnetization to perpendicular magnetization but outside the area 44 where the temperature of the intermediate layer 3 is raised above $T_3$. Therefore, the magneto-optical disk of the present embodiment permits recorded bits with a size smaller than that of the conventional magneto-optical recording medium to be separately reproduced, thereby achieving a significant improvement in the recording density.

When reproducing the next recorded bit with a shift of the laser beam 8, the temperature of the portion previously reproduced drops, and a transition occurs in the portion of the readout layer 201 from the perpendicular magnetization to the in-plane magnetization. Accordingly, in the portion having a temperature drop, a magnetic Kerr effect is no more effective. As a result, the information recorded on the portion having a temperature drop is not reproduced, thereby preventing the entering of the signal from adjacent bits, which is the cause of the generation of noise.

The following will discuss the present embodiment in more detail. First, the manufacturing process of the magneto-optical disk is explained below.

In a sputtering device provided with Al, Gd, Dy, Ho, Fe and Co targets, a transparent disk substrate 4 made of polycarbonate having grooves and pits previously formed was placed so as to confront the targets. In the sputtering device, the first transparent dielectric layer 5 made of AlN with a thickness of 60 nm, the readout layer 201 made of $Gy_{0.28}(Fe_{0.8}Co_{0.2})_{0.72}$ with a thickness of 50 nm, the intermediate layer 3 made of $Dy_{0.21}Fe_{0.79}$ with a thickness of 50 nm, the recording layer 2 made of $Dy_{0.23}(Fe_{0.82}Co_{0.18})_{0.77}$ with thickness of 50 nm and the second transparent dielectric layer 6 made of AlN with a thickness of 50 nm were formed as in the same manner as the embodiment 1.

The readout layer 201 made of $Dy_{0.28}(Fe_{0.8}Co_{0.2})_{0.72}$ has in-plane magnetization at room temperature, and a transition occurs to the perpendicular magnetization at temperature above 60° C. ($T_1=60$ ° C.), and the Curie temperature of the layer was 350° C. The intermediate layer 3 made of $Dy_{0.21}Fe_{0.79}$ is a magnetic thin film with perpendicular magnetization whose Curie temperature $T_3$ is set 90° C. The recording layer 2 made of $Dy_{0.23}(Fe_{0.82}Co_{018})_{0.77}$ is a magnetic thin film with perpendicular magnetization having a compensating temperature at room temperature, and the Curie temperature $T_2$ of the layer was 160° C.

Then, the second transparent dielectric layer 6 was coated with an ultraviolet hardening resin using a spin coat method. Thereafter, ultraviolet ray was projected thereon so as to form the overcoat layer 7 on the second transparent dielectric layer 6. Here, a heat-hardening resin may be used as well for an overcoat layer 7.

The laser beam 8 was converged onto the magneto-optical disk thus manufactured by the objective lens 9, and the disk is rotated at 10 m/s relative linear velocity with respect to the laser beam 8. While the laser beam 8 of 10 mW was being successively projected onto the disk for recording, the modulation magnetic field of ±15 kA/m was applied onto the magneto-optical disk after modulating it at 10 MHz frequency. As a result, a reverse magnetic domain with a length of 0.5 μm at 1 μm period (interval) was formed on the recording layer 2.

Thereafter, the power of the laser beam 8 was reduced to 2 mW so as to reproduce the recorded information. Then, the reproduction signal with 10 MHz frequency was obtained from the readout layer 201, according to the reverse magnetic domain formed on the recording layer 2. In the present embodiment, the constant magnetic field (external magnetic field Hex) used in a reproducing process of the embodiment 1 was not required.

On the other hand, while the laser beam 8 of 10 mW was being successively projected onto the disk for recording, the modulation magnetic field of ±15 kA/m was applied onto the magneto-optical disk after modulating it at 20 MHz frequency. As a result, a reverse magnetic domain with 0.25 μm length at 0.5 μm period (interval) was formed on the recording layer 2.

Thereafter, the power of the laser beam 8 was reduced to 2 mW so as to reproduce the recorded information. Then, the reproduction signal with 20 MHz frequency was obtained from the readout layer, according to the reverse magnetic domain formed on the recording layer 2.

As described, the magneto-optical recording medium of the present embodiment comprises:

a readout layer which has in-plane magnetization at room temperature, and in which a transition occurs from in-plane magnetization to perpendicular magnetization when the temperature of the area irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has perpendicular magnetization at room temperature, the perpendicular magnetization being maintained in a range of room temperature—Curie temperature $T_3$, and wherein the temperatures $T_1$, $T_2$ and $T_3$ satisfy the following inequality:

$T_1<T_3<T_2$, and the readout layer has such a small perpendicular magnetic anisotropy that even if the temperature of the area irradiated with a light beam is raised above $T_1$, the readout layer still has in-plane magnetization as long as the temperature of the intermediate layer drops below $T_3$ and thus the magnetization in the intermediate layer disappears, and exchange coupling force is not exerted between the intermediate layer and the readout layer.

According to the above arrangement, only the bit recorded on the recording layer which satisfy all of the following conditions is subjected to reproduction: 1) recorded within the area irradiated with the light beam; 2) recorded within the area having a temperature above $T_1$; and 3) recorded outside the area having a temperature above $T_3$. Therefore, the magneto-optical recording medium having the above arrangement permits a reproduction of a recorded bit with a size smaller than the size of the irradiated area with the light beam, thereby significantly improving the recording density. Moreover, when a reproducing operation is carried out from the magneto-optical recording medium of the present embodiment, the external magnetic field required in the embodiment 1 is not required. Thus, the magneto-optical recording medium of the present embodiment does not require the initializing magnetic field when reproducing information and permits a simple structure of the magnetic layers (exchange-coupled triplilayer).

[EMBODIMENT 3]

The following description will discuss the embodiment 3 of the present invention with reference to FIG. 3(a), FIG. 3(b), FIG. 7 and FIG. 8.

The magneto-optical disk (magneto-optical recording medium) of the present embodiment has the same arrangement as that of the embodiment 1 except that the intermediate 303 is provided in lieu of the intermediate layer 3 of the embodiment 1. The layers other than the intermediate layer 303, i.e., the transparent substrate, the first transparent dielectric layer, the readout layer, the recording layer, the second transparent dielectric layer and the overcoat layer respectively have the same configurations and properties as those of the embodiment 1. Therefore, the above layers are designated by the same codes as the embodiment 1, and the detailed descriptions thereof shall be omitted here (see FIG. 7).

The intermediate layer 303 has perpendicular magnetization at room temperature, and a transition occurs to in-plane magnetization at $T_3$ (see FIG. 8). As to the material for the intermediate layer 303, $Dy_{0.13}(Fe_{0.5}Co_{0.5})_{0.87}$ with a thickness of 50 nm may be used. $T_3$ at which a transition occurs in the intermediate layer 303 from perpendicular magnetization to in-plane magnetization is preferably set in a range of 60°–90° C.

$T_1$ at which a transition occurs in the readout layer 1 from in-plane magnetization to perpendicular magnetization is preferably set in a range of 40°–70 ° C. The Curie temperature $T_2$ of the recording layer 2 is preferably set in a range of 120°–180° C. Therefore, $T_1$, $T_2$ and $T_3$ satisfy the following inequality:

$T_1<T_3<T_2$.

When recording on the magneto-optical disk having the above arrangement, first, recording magnetic field is applied onto the magneto-optical disk, and the laser beam 8 of high power is converged onto the magneto-optical disk through the objective lens 9 so as to raise the temperature of the recording layer 2 to the vicinity of Curie temperature $T_2$, thereby forming a recording bit on the recording layer 2.

Figure 3A:
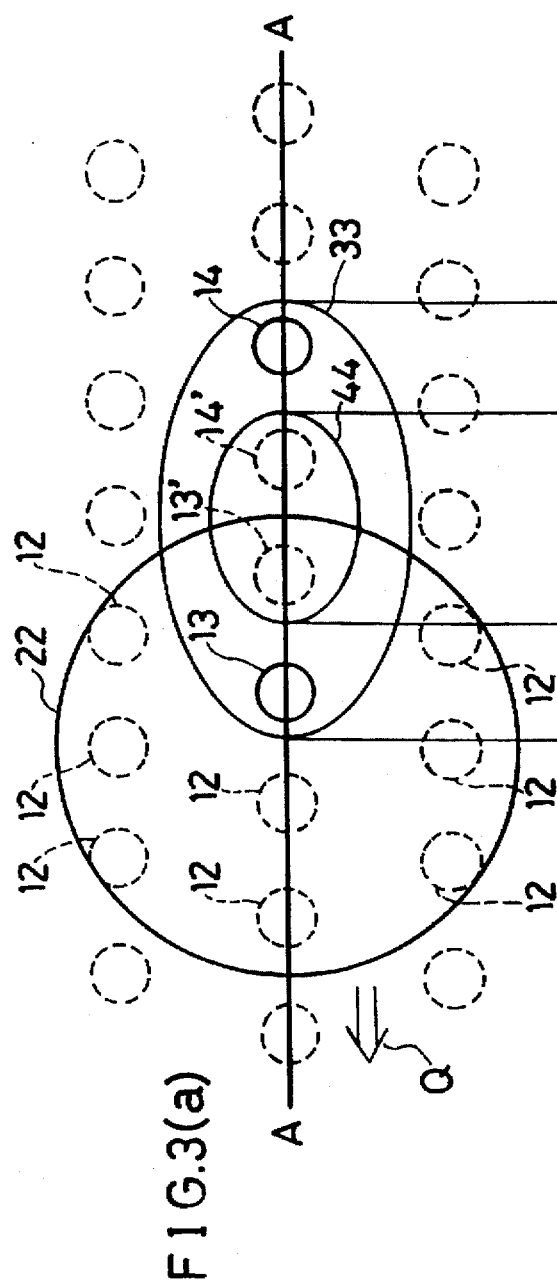
Figure 3B:
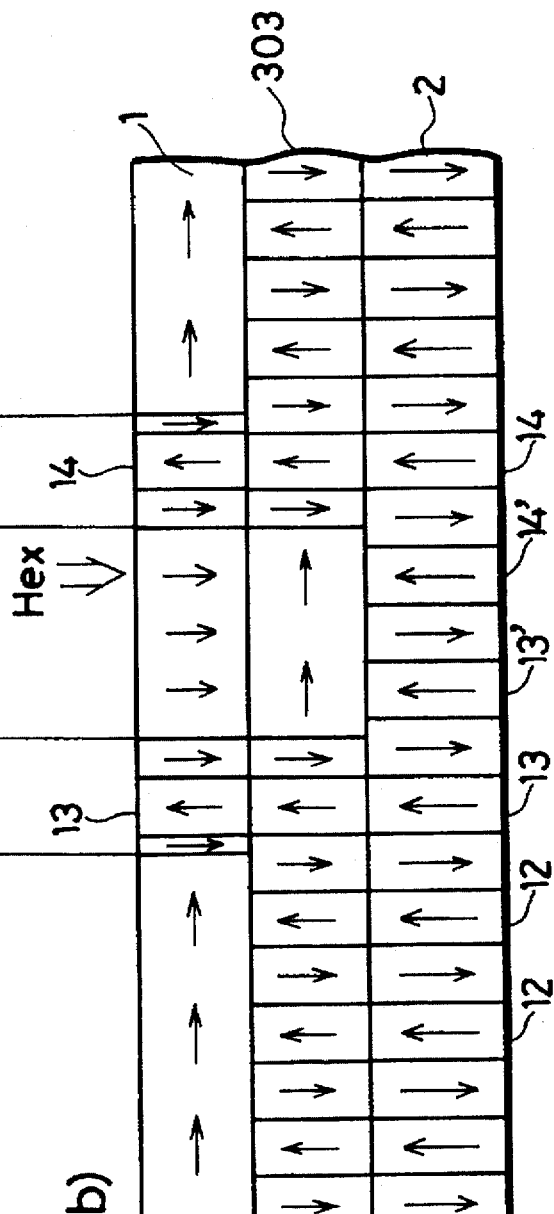

Next, the reproducing process will be described below with reference to FIGS. 3(a) and (b). FIG. 3(a) is a view of the magneto-optical disk from the laser beam 8 projecting side. FIG. 3(b) is a cross-sectional view taken on the line A—A of FIG. 3(a), which shows respective magnetization states of the magnetic layers 1, 2 and 303.

First, a laser beam 8 with a lower power than that used in recording is projected onto the magneto-optical disk. The laser beam 8 moves with respect to the magneto-optical disk in the direction of arrow Q, and the area 33 (the center of the area 33) on the magneto-optical disk, having a temperature above $T_1$ is slightly displaced backward from the area 22 irradiated with the laser beam 8 (the center of the area 22). Therefore, the area 44 (the center of the area 44) having the temperature rise above $T_3$ of the intermediate layer 303 is slightly displaced backward from the area 22 (the center of the area 22) irradiated with the laser beam 8.

Here, in the intermediate layer 303, a transition occurs from perpendicular magnetization to in-plane magnetization in the area 44 having a temperature above $T_3$, whereas, in other portions of the intermediate layer 303, perpendicular magnetization is maintained, and the magnetization direction in the recording layer 2 is copied to the intermediate layer 303 by exchange coupling force exerted between the recording layer 2 and the intermediate layer 303.

The readout layer 1 has perpendicular magnetization in the area 33 having a temperature rise above $T_1$, and has in-plane magnetization in other portions of the readout layer 1. Here, within the area 33 but outside the area 44 of the readout layer 1, the magnetization direction in the intermediate layer 303 is copied to the readout layer 1 by the exchange coupling force exerted between the readout layer 303 and the readout layer 1. Specifically, the information in the form of magnetization direction recorded on the recording layer 2 is copied to the readout layer 1 through the magnetization of the intermediate layer 303, and within the area 33 but outside the area 44, the magnetization direction in the readout layer 1 becomes identical with the magnetization direction in the recording layer 2.

As described, the exchange coupling force is exerted onto the readout layer 1 from the recording layer 2 through the intermediate layer 303. Thus, in reproduction, when the intermediate layer 303 has in-plane magnetization in the area 44, the exchange coupling force exerted from the recording layer 2 onto the readout layer 1 becomes significantly smaller compared with the case where the intermediate layer 303 has perpendicular magnetization in other portions than the area 44. As described, in the area 44 where the exchange coupling force exerted between the recording layer 2 and the read-out layer 1 becomes extremely small, the magnetization in the readout layer 1 depends on the property of the readout layer 1, i.e., the intensity of the perpendicular magnetic anisotropy.

The readout layer 1 of the present embodiment has relatively large perpendicular magnetic anisotropy. Therefore, even in the area 44 of the readout layer 1 in which the exchange coupling force exerted from the recording layer 2 through the intermediate layer 3 becomes extremely small, the perpendicular magnetization can be maintained, and the magnetization direction in the area 44 is arranged so as to be identical with the magnetization direction in the recording layer 2. Here, since exchange coupling force exerted between the recording layer 2 and the readout layer 1 is extremely small, by applying appropriate intensity of the external magnetic field $H_{ex}$ onto the readout layer 1, while the magnetization direction copied from the recording layer 2 is maintained within the area 33 but outside the area 44 of the readout layer 1, the magnetization direction in the portion of the readout layer 1 corresponding to the area 44 can be always set in the same direction. Therefore, with the application of an appropriate external magnetic field Hex onto the readout layer 1 in reproducing, the recording bits 13' and 14' recorded in the area 44 having a temperature above $T_3$ are not reproduced.

As described, when the reproducing process is carried out, the portion having the highest temperature of the magneto-optical disk is slightly displaced backward from the center of the laser beam 8. Therefore, the area 22 irradiated with the laser beam 8 includes a portion of the area 33 having a temperature above $T_1$ at which a transition occurs in the readout layer 1 from in-plane magnetization to perpendicular magnetization and a portion of the area 44 having a temperature above Curie temperature $T_3$. Therefore, the recording bits 14, 14' recorded within the area 33 but outside the area 22 irradiated with the laser beam 8 are not reproduced.

In-plane magnetization is maintained outside the area 33 having a temperature above $T_1$ of the readout layer 1, and thus the magnetic Kerr effect is not shown with respect to a perpendicular incident light. Therefore, the recording bit 12 recorded within the area 22 irradiated with the light beam but outside the area 33 having a temperature above $T_1$ is not reproduced.

As described, the only information to be reproduced with the application of the laser beam 8 is the recording bit 13 recorded within the irradiated area 22 with the laser beam 8 and within the area 33 having a temperature above $T_1$ at which a transition occurs in the readout layer 1 from in-plane magnetization to perpendicular magnetization but outside the area 44 having a temperature above $T_3$s. Therefore, the magneto-optical disk of the present embodiment permits recorded bits with a size smaller than that of the conventional magneto-optical recording medium to be separately reproduced, thereby achieving a significant improvement in the recording density.

When reproducing the next recorded bit with a shift of the laser beam 8, the temperature of the portion previously irradiated with the laser beam 8 drops, and a transition occurs in the portion of the readout layer 1 from the perpendicular magnetization to the in-plane magnetization. Accordingly, in the portion having a temperature drop, a magnetic Kerr effect is no more effective. As a result, the information recorded on the portion is not reproduced, thereby preventing the entering of the signal from adjacent bits which are the cause of the generation of noise.

The following will discuss the present embodiment in more detail. First, the manufacturing process of the magneto-optical disk is explained below.

In the sputtering device of the embodiment 1 provided with Al, Gd, Dy, Ho, Fe and Co targets, the transparent disk substrate 4 made of polycarbonate having groove and pit formed beforehand was placed so as to confront the targets. In the sputtering device, the first transparent dielectric layer 5 made of AlN with a thickness of 60 nm, the readout layer 1 made of $Dy_{0.13}(Fe_{0.5}Co_{0.18})_{0.65}$ with a thickness of 50 nm, the intermediate layer 303 made of $Dy_{0.13}s(Fe_{0.5}Co_{0.5})_{0.87}$ with a thickness of 50 nm, the recording layer 2 made of $Dy_{0.23}(Fe_{0.82}Co_{0.18})_{0.77}$ with thickness of 50 nm the second transparent dielectric layer 6 made of AlN with a thickness of 50 nm were formed as in the same manner as the embodiment 1.

The readout layer 1 made of $Dy_{0.35}(Fe_{0.5}Co_{0.5})_{0.65}$ has in-plane magnetization at room temperature, and a transition occurs to the perpendicular magnetization at temperature above 60° C. (T=60° C.), and the Curie temperature of the layer 1 was 320° C. The intermediate layer 303 made of $Dy_{0.13(Fe0.5}Co_{0.5})_{0.87}$ has perpendicular magnetization at room temperature, and a transition occurs from perpendicular magnetization to in-plane magnetization at a temperature above 90° C. ($T_3$=90° C.). The Curie temperature of the intermediate layer 303 was set at 380° C. The recording layer 2 made of $Dy_{0.23}(Fe_{0.82}Co_{0.18})_{0.77}$ is a magnetic thin film with perpendicular magnetization having a compensating temperature at room temperature, and the Curie temperature $T_2$ of the layer was set at 160° C.

Then, the second transparent dielectric layer 6 was coated with an ultraviolet hardening resin using a spin coat method. Thereafter, ultraviolet ray was projected thereon so as to form the overcoat layer 7 on the second transparent dielectric layer 6. Here, a heat-hardening resin may be used as well for an overcoat layer 7.

The laser beam 8 was converged onto the magneto-optical disk thus manufactured by the objective lens 9, and the disk is rotated at 10 m/s relative linear velocity with respect to the laser beam 8. While the laser beam 8 of 10 mW was being successively projected onto the disk in recording, the modulation magnetic field of ±15 kA/m was applied onto the magneto-optical disk after modulating it at 20 MHz frequency. As a result, a reverse magnetic domain with a length of 0.25 μm at 0.5 μm period was formed on the recording layer 2.

Thereafter, the power of the laser beam 8 was reduced to 2 mW while a constant magnetic field of +5 kA/m (an external magnetic field Hex) is being applied so as to reproduce the recorded information. Then, the reproduction signal with 20 MHz frequency was obtained from the readout layer 1, according to the reverse magnetic domain formed on the recording layer 2.

As described, the magneto-optical recording medium of the present embodiment comprises:

- a readout layer which has in-plane magnetization at room temperature, and a transition occurs from in-plane magnetization to perpendicular magnetization when the temperature of the area irradiated with a light beam is raised above $T_1$;
- a recording layer for recording thereon information magneto-optically, which has perpendicular magnetization at room temperature, the perpendicular magnetization being maintained in a range of room temperature—Curie temperature $T_2$; and
- an intermediate layer formed between the readout layer and the recording layer, which has perpendicular magnetization at room temperature, and in which a transition occurs from perpendicular magnetization to in-plane magnetization in a range of room temperature—Curie temperature $T_3$, and wherein the above temperatures $T_1$, $T_2$ and $T_3$ satisfy the following inequality:

$$T_1 < T_3 < T_2.$$

According to the above arrangement, the projection of the laser beam is carried out while an eternal magnetic field is being applied. The external magnetic field is applied for arranging the magnetization direction in the readout layer in an area having a temperature above $T_3$ (an area having an extremely small exchange coupling force exerted between the intermediate layer and the readout layer, and thus has in-plane magnetization) always in the same direction. Therefore, only the recording bit recorded in the recording layer which satisfy all of the following conditions are subjected to reproduction: 1) recorded within the area irradiated with the light beam; 2) recorded within the area having a temperature above $T_1$; and 3) recorded outside the area having a temperature above $T_3$. Therefore, the magneto-optical recording medium having the above arrangement permits a reproduction of a recorded bit with a size smaller than the size of the irradiated area with the light beam, thereby achieving a significant improvement in the recording density. Thus, the magneto-optical recording medium of the present embodiment does not require the initializing magnetic field when reproducing information and permits a simple structure of the magnetic layers (exchange-coupled triplilayer).

[EMBODIMENT 4]

Figure 4A:
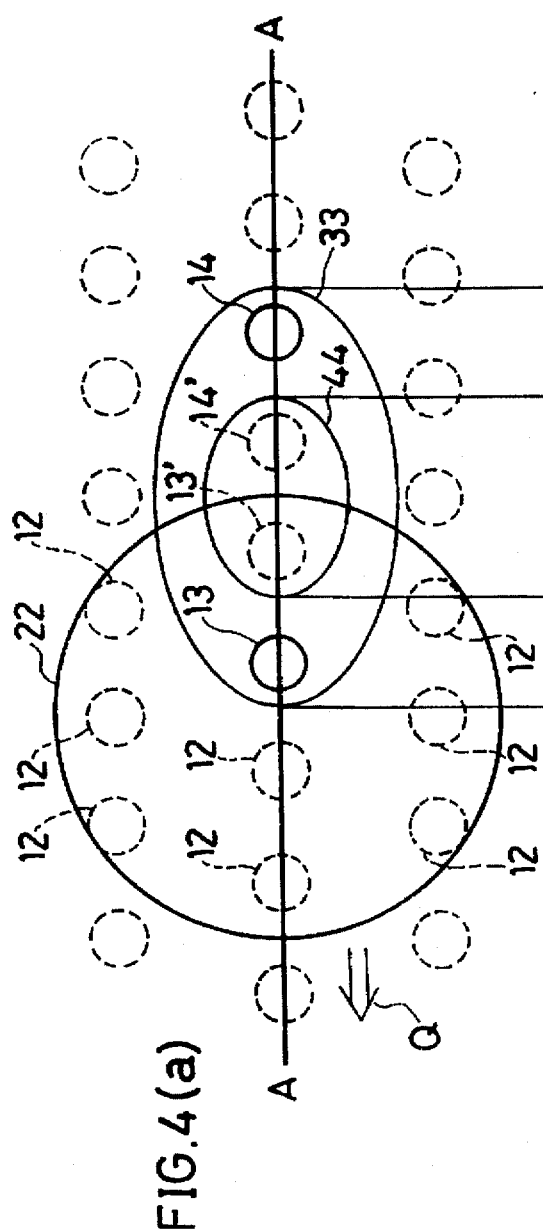
Figure 4B:
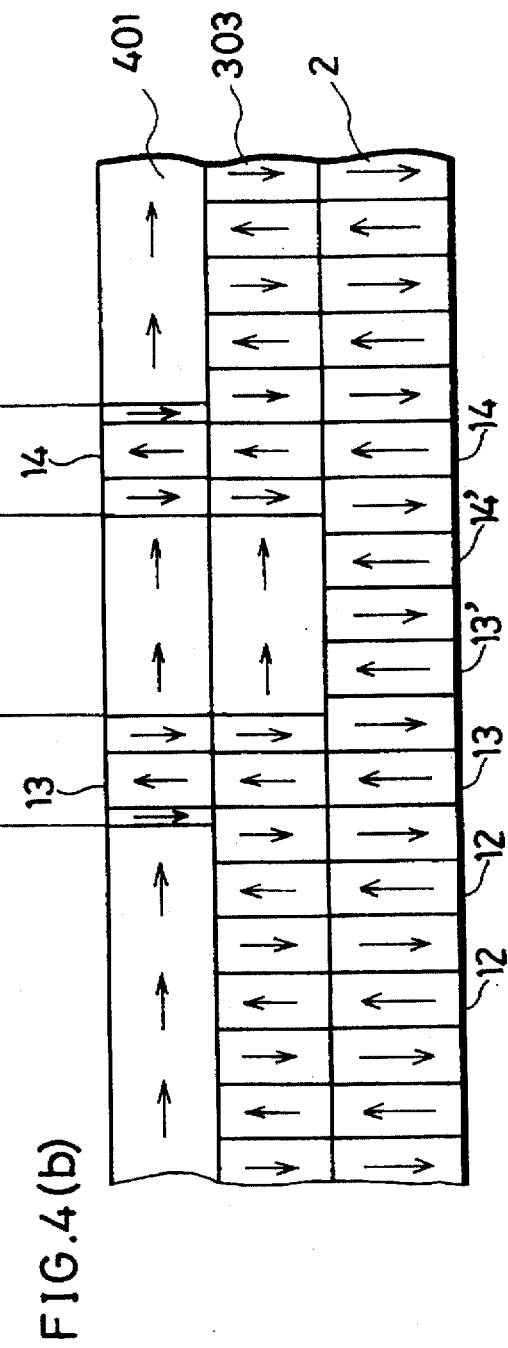

The following description will discuss the embodiment 4 of the present invention with reference to FIG. 4(a), FIG. 4(b) and FIG. 7.

The magneto-optical disk (magneto-optical recording medium) of the present embodiment has the same arrangement as that of the embodiment 3 except that the readout layer 401 is provided in lieu of the readout layer 1 of the embodiment 3. The layers other than the readout layer, i.e., the substrate, the first transparent dielectric layer, the intermediate layer, the recording layer, the second transparent dielectric layer and the overcoat layer respectively have the same configurations and properties as those of the embodiment 3. Therefore, the above layers are designated by the same codes as the embodiment 3, and the detailed descriptions thereof shall be omitted here (see FIG. 7).

The readout layer 401 is the same as the readout layer 1 of the embodiment 3 in that it has in-plane magnetization at room temperature, and has perpendicular magnetization at a temperature above $T_3$. However, the readout layer 1 of the embodiment 3 has relatively large perpendicular magnetic anisotropy, whereas, the readout layer 401 of the present embodiment has relatively small perpendicular magnetic anisotropy. Specifically, the readout layer 401 has such a small perpendicular magnetic anisotropy that even if the temperature of the portion irradiated with the light beam of the readout layer 401 is raised above $T_1$, as long as the temperature of the intermediate layer 303 becomes above Curie temperature $T_3$ and thus it has in-plane magnetization and exchange coupling force exerted between the intermediate layer 303 and the readout layer 401 becomes extremely small, the readout layer 401 has in-plane magnetization. As to the material for the readout layer 401, the rear-earth transition metal wherein the content of the rare-earth metal is set greater than that in the compensating composition at room temperature may be used. In the present embodiment, $Gd_{0.28}(Fe_{0.8}Co_{0.2})_{0.72}$ with a thickness of 50 nm is employed.

$T_1$ at which a transition occurs in the readout layer 401 from in-plane magnetization to perpendicular magnetization is preferably set in a range of 40°–70° C. The Curie temperature $T_3$ of the intermediate layer 303 is preferably set in a range of 60°–90° C. The Curie temperature $T_2$ of the recording layer 2 is preferably set in a range of 120°–180° C. Therefore, $T_1$, $T_2$ and $T_3$ satisfy the following inequality:

$$T_1 < T_3 < T_2.$$

When recording on the magneto-optical disk having the above arrangement, first, recording magnetic field is applied onto the magneto-optical disk, and the laser beam 8 of high power is converged onto the magneto-optical disk through the objective lens 9 so as to raise the temperature of the recording layer 2 to the vicinity of Curie temperature $T_2$, thereby forming a recording bit on the recording layer 2.

Next, the reproducing process will be described below with reference to FIGS. 4(a) and (b). FIG. 4(a) is a view of the magneto-optical -disk from the laser beam 8 projecting side. FIG. 4(b) is a cross-sectional view taken on the line A—A of FIG. 4(a), which shows respective magnetization states of the magnetic layers 401, 2 and 303.

First, a laser beam 8 with a lower power than that used in recording is projected onto the magneto-optical disk. The laser beam 8 moves with respect to the magneto-optical disk in the direction of arrow Q, and the area 33 (the center of the area 33) on the magneto-optical disk, having a temperature rise above $T_1$ of the magnetic layer 401 by projecting thereto a laser beam 8 is slightly displaced backward from the area 22 (the center of the area 22) irradiated with the laser beam 8. Therefore, the area 44 (the center of the area 44) having the temperature rise above $T_3$ of the intermediate layer 303 is slightly displaced backward from the area 22 (the center of the area 22) irradiated with the laser beam 8.

As in the case of the embodiment 3, the intermediate layer 303 has perpendicular magnetization in other portions than the area 44, and the magnetization direction in the recording layer 2 is copied to the intermediate layer 303 by exchange coupling force exerted between the recording layer 2 and the intermediate layer 303.

Similarly, the information in the form of magnetization direction recorded on the recording layer 2 is copied to the portion within the area 33 but outside the area 44 of the readout layer 401 through the magnetization in the intermediate layer 303. The magnetization direction in the portion within the area 33 but outside the area 44 of the readout layer 401 becomes identical with the magnetization direction in the recording layer 2.

The readout layer 401 of the present embodiment has relatively small perpendicular magnetic anisotropy. Therefore, the area 44 wherein very weak exchange coupled force is exerted from the intermediate layer 3 has in-plane magnetization and does not have magneto-optical effect with respect to a perpendicular incident light. Therefore, the recording bits 13' and 14' recorded on the recording layer 2 are not reproduced by being masked with the in-plane magnetization in the readout layer 401. In the above arrangement of the present embodiment, in producing, the external magnetic field Hex used in the embodiment 3 for arranging the magnetization direction in the readout layer corresponding to the area 44 in the same direction is not required.

As described, in reproducing, the portion having the highest temperature of -the magneto-optical disk is slightly displaced backward from the center of the laser beam 8. Therefore, the area 22 irradiated with the laser beam 8 includes a portion of the area 33 having a temperature above $T_1$ at which a transition of the readout layer 401 occurs from in-plane magnetization to perpendicular magnetization and a portion of the area 44 having a temperature above Curie temperature $T_3$ Therefore, the recording bits 14, 14' recorded within the area 33 but outside the area 22 irradiated with the laser beam 8 are not reproduced.

As described, the only information to be reproduced with the application of the laser beam 8 is the recording bit 13 recorded within the area 22 irradiated with the laser beam 8 and within the area 33 having a temperature above $T_1$ at which a transition occurs in the readout layer 401 from in-plane magnetization to perpendicular magnetization but outside the area 44 having a temperature above Curie temperature $T_3$. Therefore, the magneto-optical disk of the present embodiment permits recorded bits with a size smaller than that of the conventional magneto-optical recording medium to be separately reproduced, thereby achieving a significant improvement in the recording density.

When reproducing the-next recorded bit with a shift of the laser beam 8, the temperature of the portion previously irradiated with the laser beam 8 drops, and a transition occurs in the portion of the readout layer 401 from the perpendicular magnetization to the in-plane magnetization. Accordingly, in the portion having a temperature drop, the magneto-optical effect is no more effective. As a result, information recorded on the portion is not reproduced, thereby preventing the entering of the signal from adjacent bits, which is the cause of the generation of noise.

The following will discuss the present embodiment in more detail. First, the manufacturing process of the magneto-optical disk is explained below.

In a sputtering device of the embodiment 1 provided with Al, Gd, Dy, Ho, Fe and Co targets, a transparent disk substrate 4 made of polycarbonate having grooves and pits formed beforehand was placed so as to confront the targets. In the sputtering device, the first transparent dielectric layer 5 made of AlN with a thickness of 60 nm, the readout layer 401 made of $Gd_{0.28}(Fe_{0.8}Co_{0.2})_{0.72}$ with a thickness of 50 nm, the intermediate layer 303 made of $Dy_{0.13}(Fe_{0.5}Co_{0.5})_{0.87}$ with a thickness of 50 nm, the recording layer 2 made of $Dy_{0.23}(Fe_{0.82}Co_{0.18})_{0.72}$ with thickness of 50 nm and the second transparent dielectric layer 6 made of AlN with a thickness of 50 nm were formed in this order as in the same manner as the embodiment 1.

The readout layer 401 made of $Gd_{0.28}(Fe_{0.8}Co_{0.2})_{0.72}$ has in-plane magnetization at room temperature, and a transition occurs to the perpendicular magnetization at temperature above 60° C. ($T_1$=60° C.), and the Curie temperature of the layer was 350° C. The intermediate layer 303 made of $Dy_{0.13}(Fe_{0.5}Co_{0.5})_{0.87}$ has perpendicular magnetization at room temperature, and a transition occurs from perpendicular magnetization to in-plane magnetization at temperature above 90° C. ($T_3$=90° C.). The Curie temperature of the intermediate layer 303 was 380° C. The recording layer 2 made of $Dy_{0.23}(Fe_{0.82}Co_{0.18})_{0.77}$ is a magnetic thin film with perpendicular magnetization having a compensating temperature at room temperature, and the Curie temperature $T_2$ of the layer was 160° C.

Then, the second transparent dielectric layer 6 was coated with an ultraviolet hardening resin using a spin coat method. Thereafter, ultraviolet ray was projected thereon so as to form the overcoat layer 7 on the second transparent dielectric layer 6. Here, a heat-hardening resin may be used as well for an overcoat layer 7.

The laser beam 8 was converged onto the magneto-optical disk thus manufactured by the objective lens 9, and the disk is rotated at 10 m/s relative linear velocity with respect to the laser beam 8. While the laser beam 8 of 10 mW was being successively projected onto the disk for recording, the modulation magnetic field of ±15 kA/m at 20 MHz frequency was applied onto the magneto-optical disk. As a result, a reverse magnetic domain with a length of 0.25 μm at 0.5 μm frequency (interval) was formed on the recording layer 2.

Thereafter, the power of the laser beam 8 was reduced to 2 mW so as to reproduce the recorded information, and the reproduction signal with 20 MHz frequency was obtained from the readout layer 401, according to the reverse magnetic domain formed on the recording layer 2. In the present embodiment, the constant magnetic field (external magnetic field Hex) used in a reproducing process of the embodiment 3 was not required.

As described, the magneto-optical recording medium of the present embodiment comprises:

a readout layer which has in-plane magnetization at room temperature, and in which a transition occurs from in-plane magnetization to perpendicular magnetization when the temperature of the area irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has perpendicular magnetization at room temperature, the perpendicular magnetization being maintained in a range of room temperature—Curie temperature $T_3$, and wherein the temperatures $T_1$, $T_2$ and $T_3$ satisfy the following inequality:

$$T_1 < T_3 < T_2, \text{ and}$$

the readout layer has such a small perpendicular magnetic anisotropy that even if the temperature of the area irradiated with a light beam is raised above $T_1$, the readout layer still has in-plane magnetization as long as the temperature of the intermediate layer is raised above $T_3$, and thus it has in-plane magnetization, and exchange coupling force exerted between the intermediate layer and the readout layer becomes extremely small.

According to the above arrangement, only the bit recorded on the recording layer which satisfy all of the following conditions is subjected to reproduction: 1) recorded within the area irradiated with the light beam; 2) recorded within the area having a temperature above $T_1$; and 3) recorded outside the area having a temperature above $T_3$. Therefore, the magneto-optical recording medium having the above arrangement permits a reproduction of a recorded bit with a size smaller than the size of the irradiated area with the light beam, thereby significantly improving the recording density. Moreover, when a reproducing operation is carried out from the magneto-optical recording medium of the present embodiment, the external magnetic field required in the embodiment 3 is not required. Moreover, the magneto-optical recording medium of the present embodiment does not require the initializing magnetic field when reproducing information and permits a simple structure of the magnetic layers (exchange-coupled triplilayer).

[EMBODIMENT 5]

The following description will discuss the embodiment 5 of the present invention with reference to FIG. 5(a), FIG. 5(b), FIG. 7 and FIG. 8.

The magneto-optical disk (magneto-optical recording medium) of the present embodiment has the same arrangement as that of the embodiment 1 except that the intermediate 503 is provided in lieu of-the intermediate layer 3 of the embodiment 1. The layers other than the intermediate layer 503, i.e., the transparent substrate, the first transparent dielectric layer, the readout layer, the recording layer, the second transparent dielectric layer and the overcoat layer respectively have the same configurations and properties as those of the embodiment 1. Therefore, the above layers are designated by the same codes as the embodiment 1, and the detailed descriptions thereof shall be omitted here (see FIG. 7).

The intermediate layer 503 has in-plane magnetization at room temperature, and in-plane magnetization is maintained in a temperature range of room temperature to Curie temperature $T_3$ (see FIG. 8). As to the material for the intermediate layer 503, $Dy_{0.09}Fe_{0.91}$ with a thickness of 50 nm may be used. The Curie temperature $T_3$ is preferably set in a range of 60°–90° C.

$T_1$ at which a transition occurs in the readout layer 1 from in-plane magnetization to perpendicular magnetization is preferably set in a range of 40°–70° C. The Curie temperature $T_2$ of the recording layer 2 is preferably set in a range of 120°–180° C. Therefore, $T_1$, $T_2$ and $T_3$ satisfy the following inequality:

$$T_1 < T_3 < T_2.$$

When recording on the magneto-optical disk having the above arrangement, first, recording magnetic field is applied onto the magneto-optical disk, and the laser beam 8 of high power is converged onto the magneto-optical disk through the objective lens 9 so as to raise the temperature of the recording layer 2 to the vicinity of Curie temperature $T_2$, thereby forming a recording bit on the recording layer 2.

Figure 5A:
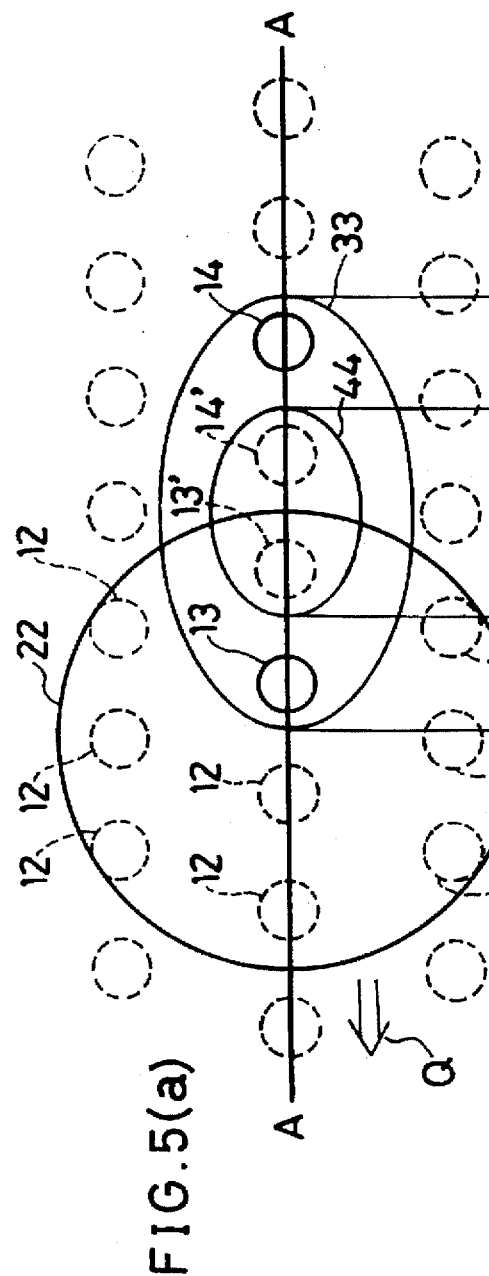
Figure 5B:
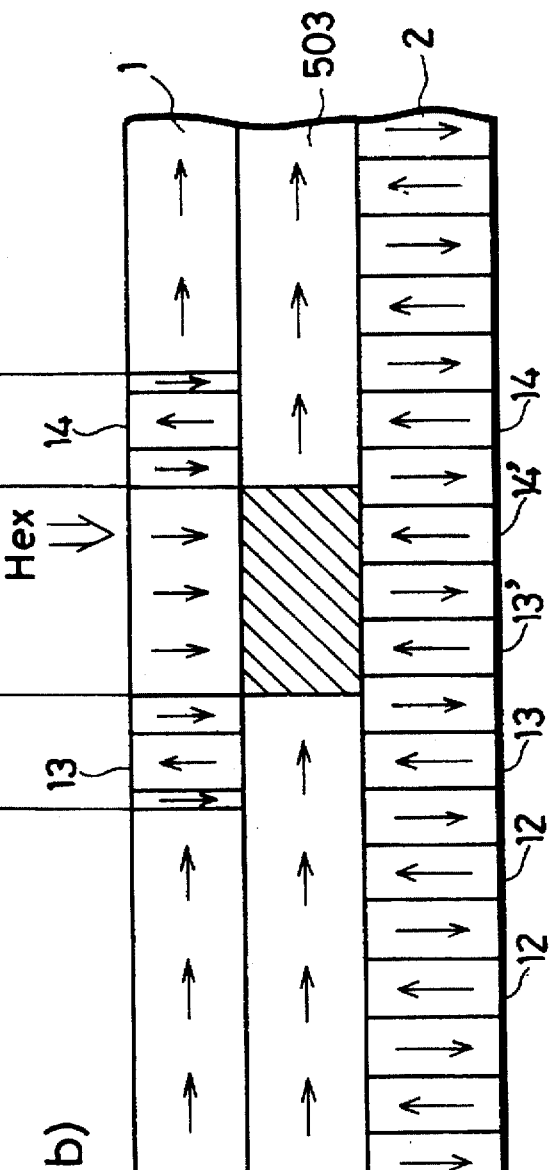

Next, the reproducing process will be described below with reference to FIGS. 5(a) and (b). FIG. 5(a) is a view of the magneto-optical disk from the laser beam 8 projecting side. FIG. 5(b) is a cross-sectional view taken on the line A—A of FIG. 5(a), which shows respective magnetization states of the magnetic layers 1, 2 and 503.

First, a laser beam 8 with a lower power than that used in recording is projected onto the magneto-optical disk. The laser beam 8 moves with respect to the magneto-optical disk in the direction of arrow Q, and the area 33 (the center of the area 33) on the magneto-optical disk, having a temperature above $T_1$ of the readout layer 1 by projecting thereon a laser beam 8 is slightly displaced backward from the area 22 (the center of the area 22) irradiated with the laser-beam 8. Therefore, the area 44 (the center of the area 44) having the temperature rise above $T_3$ of the intermediate layer 503 is slightly displaced backward from the area 22 (the center of the area 22) irradiated with the laser beam 8.

In the intermediate layer 503, magnetization disappears from the area 44 having a temperature above Curie temperature $T_3$, whereas, in other portions of the intermediate layer 503, the in-plane magnetization is maintained. The readout layer 1 has perpendicular magnetization in the area 33 having a temperature rise above $T_1$, whereas, has in-plane magnetization in other portions of the readout layer 1. Here, within the area 33 but outside the area 44 of the readout layer 1, exchange coupling force is exerted from the recording layer 2 through the in-plane magnetization in the intermediate layer 503. As a result, the magnetization direction in the readout layer 1 becomes identical with the magnetization direction in the recording layer 2 in the area 33 but outside the area 44.

As described, the information in the form of magnetization direction in the recording layer 2 is copied to the readout layer 1 through the in-plane magnetization in the intermediate layer 503. Therefore, the information in the form of magnetization direction recorded on the recording layer 2 is not copied to the readout layer 1 in the area 44 in which magnetization no longer exists of the intermediate layer 503. Specifically, in the area 44 in which magnetization no longer exists of the intermediate layer 503, the information in the form of magnetization direction in the recording layer 2 cannot exert the exchange coupling force to the readout layer 1. Therefore, in the portion corresponding to the area 44 of the readout layer 1 is in a free state without being affected by the exchange coupling force from the intermediate layer 503. As described, the magnetization in the readout layer 1 depends on the property of the readout layer 1, i.e., the intensity of the perpendicular magnetic anisotropy.

The readout layer 1 of the present embodiment has relatively large perpendicular magnetic anisotropy. Therefore, the perpendicular magnetization is maintained in the readout layer 1 even in the area 44 in which an exchange coupling force is not exerted from the intermediate layer 503. Therefore, in the present embodiment, in reproducing, an external magnetic field $H_{ex}$ is applied onto the magneto-optical disk in order to arrange the magnetization direction in the readout layer 1 corresponding to the area 44 always in the same direction. Therefore, the recording bits 13' and 14' recorded in the area 44 having a temperature above $T_3$ are not reproduced.

As described, when the reproducing process is carried out, the portion having the highest temperature of the magneto-optical disk is slightly displaced backward from the center of the laser beam 8. Therefore, the area 22 irradiated with the laser beam 8 includes a portion of the area 33 having a temperature above $T_1$ at which a transition occurs in the readout layer 1 from in-plane magnetization to perpendicular magnetization and a portion of the area 44 having a temperature above Curie temperature $T_3$ of the intermediate layer 503. Therefore, the recording bits 14, 14' recorded within the area 33 but outside the area 22 irradiated with the laser beam 8 are not reproduced.

In-plane magnetization is maintained outside the area 33 having a temperature above $T_1$ of the readout layer 1, and thus the magnetic Kerr effect is not shown with respect to a perpendicular incident light. Therefore, the recording bits 12 recorded within the area 22 irradiated with the light beam 8 but outside the area 33 having a temperature above $T_1$ are not reproduced.

As described, the only information to be reproduced with the application of the laser beam 8 is the recording bit 13 recorded within the irradiated area 22 with the laser beam 8 and within the area 33 having a temperature above $T_1$ at which a transition occurs in the readout layer 1 from in-plane magnetization to perpendicular magnetization but outside the area 44 having a temperature above the Curie temperature $T_3$ of the intermediate layer 503. Therefore, the magneto-optical disk of the present embodiment permits recorded bits with a size smaller than that of the conventional magneto-optical recording medium to be separately reproduced, thereby achieving a significant improvement in the recording density.

When reproducing the next recorded bit with a shift of the laser beam 8, the temperature of the portion previously reproduced drops, and a transition occurs in the portion of the readout layer 1 from the perpendicular magnetization to the in-plane magnetization. Accordingly, in the portion having a temperature drop, a magnetic Kerr effect is no more effective. As a result, information recorded on the portion is not reproduced, thereby preventing the entering of the signal from adjacent bits, which is the cause of the generation of noise.

The following will discuss the present embodiment in more detail. First, the manufacturing process of the magneto-optical disk is explained below.

In the sputtering device of the embodiment 1 provided with Al, Gd, Dy, Ho, Fe and Co targets, the transparent disk substrate 4 made of polycarbonate having groove and pit formed beforehand was placed so as to confront the targets. In the sputtering device, the first transparent dielectric layer 5 made of AlN with a thickness of 60 nm, the readout layer 1 made of $Dy_{0.35}(Fe_{0.5}Co_{0.5})_{0.65}$ with a thickness of 50 nm, the intermediate layer 503 made of $Dy_{0.09}Fe_{0.91}$ with a thickness of 50 nm, the recording layer 2 made of $Dy_{0.23}(Fe_{0.82}Co_{0.18})_{0.77}$ with thickness of 50 nm and the second transparent dielectric layer 6 made of AlN with a thickness of 50 nm were formed as in the same manner as the embodiment 1.

The readout layer 1 made of $Dy_{0.35}(Fe_{0.5}Co_{0.5})_{0.65}$ has in-plane magnetization at room temperature, and a transition occurs to the perpendicular magnetization at temperature above 60° C. ($T_1$=60° C.), and the Curie temperature of the layer 1 was 320° C. The intermediate layer 503 made of $Dy_{0.09}Fe_{0.91}$ has in-plane magnetization at room temperature, and the Curie temperature $T_3$ was 90° C. The recording layer 2 made of $Dy_{0.23}(Fe_{0.82}Co_{0.18})_{0.77}$ is a magnetic thin film with perpendicular magnetization having a compensating temperature at room temperature, and the Curie temperature $T_2$ of the layer was 160° C.

Then, the second transparent dielectric layer 6 was coated with an ultraviolet hardening resin using a spin coat method. Thereafter, ultraviolet ray was projected thereon so as to form the overcoat layer 7 on the second transparent dielectric layer 6. Here, a heat-hardening resin may be used as well for an overcoat layer 7.

The laser beam 8 was converged onto the magneto-optical disk thus manufactured by the objective lens 9, and the disk is rotated at 10 m/s relative linear velocity with respect to the laser beam 8. While the laser beam 8 of 10 mW was being successively projected onto the disk in recording, the modulation magnetic field of ±15 kA/m at 20 MHz frequency was applied onto the magneto-optical disk. As a result, a reverse magnetic domain with a length of 0.25 μm at 0.5 μm period was formed on the recording layer 2.

Thereafter, the power of the laser beam 8 was reduced to 2 mW, and a constant magnetic field of +5 kA/m (an external magnetic field Hex) so as to reproduce the recorded information. Then, the reproduction signal with 20 MHz frequency was obtained from the readout layer 1, according to the reverse magnetic domain formed on the recording layer 2.

As described, the magneto-optical recording medium of the present embodiment comprises:

a readout layer which has in-plane magnetization at room temperature, and in which a transition occurs from in-plane magnetization to perpendicular magnetization when the temperature of the area irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has in-plane magnetization at room temperature, the in-plane magnetization being maintained in a range of room temperature—Curie temperature $T_3$, and wherein the temperatures $T_1$, $T_2$ and $T_3$ satisfy the following inequality:

$T_1 < T_3 < T_2$.

According to the above arrangement, the projection of the laser beam is carried out while an external magnetic field is being applied. The external magnetic filed is applied for arranging the-magnetization direction in the readout layer in an area having a temperature above $T_3$ (an area having no exchange coupling force exerted between the intermediate layer and the readout layer as the magnetization in the intermediate layer disappears) always in the same direction. Therefore, only the recording bit recorded in the recording layer which satisfy all of the following conditions are subjected to reproduction: 1) recorded within the area irradiated with the light beam; 2) recorded within the area having a temperature above $T_1$; and 3) recorded outside the area having a temperature above $T_3$. Therefore, the magneto-optical recording medium having the above arrangement permits a reproduction of a recorded bit with a size smaller than the size of the irradiated area with the light beam, thereby achieving a significant improvement in the recording density. Thus, the magneto-optical recording medium of the present embodiment does not require the initializing magnetic field when reproducing information and permits a simple structure of the magnetic layers (exchange-coupled triplilayer).

[EMBODIMENT 6]

Figures 6A, 6B:
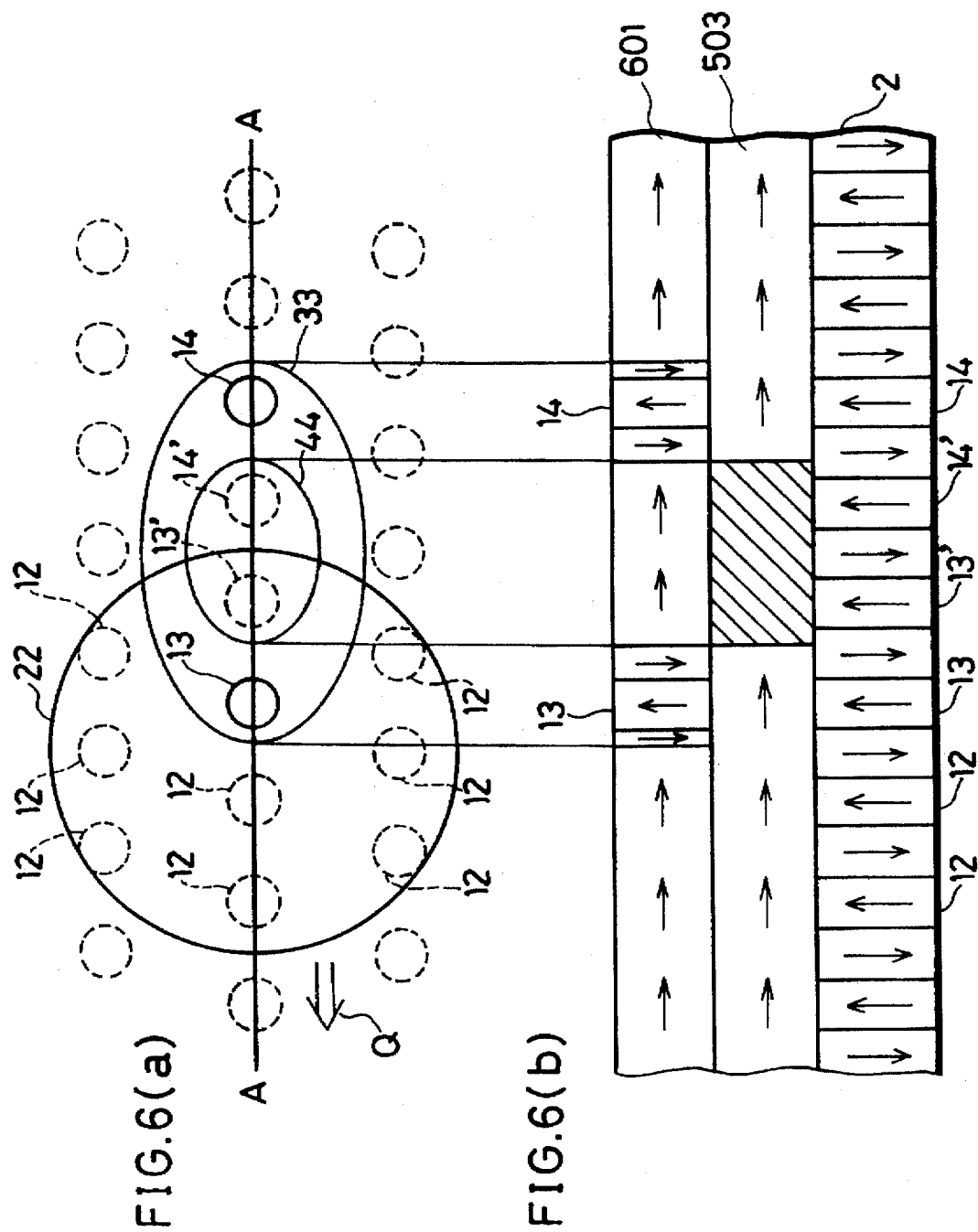

The following description will discuss the embodiment 6 of the present invention with reference to FIG. 6(a), FIG. 6(b) and FIG. 7.

The magneto-optical disk (magneto-optical recording medium) of the present embodiment has the same arrangement as that of the embodiment 5 except that the readout layer 601 is provided in lieu of the readout layer 1 of the embodiment 5. The layers other than the readout layer, i.e., the substrate, the first transparent dielectric layer, the intermediate layer, the recording layer, the second transparent dielectric layer and the overcoat layer respectively have the same configurations and properties as those of the embodiment 5. Therefore, the above layers are designated by the same codes as the embodiment 5, and the detailed descriptions thereof shall be omitted here (see FIG. 7).

The readout layer 601 is the same as the readout layer 1 of the embodiment 5 in that it has in-plane magnetization at room temperature, whereas, has perpendicular magnetization at a temperature above However, the readout layer 1 of the embodiment 5 has relatively large perpendicular magnetic anisotropy, whereas, the readout layer 601 of the present embodiment has relatively small perpendicular magnetic anisotropy. Specifically, the readout layer 601 has such a small perpendicular magnetic anisotropy that even if the temperature of the portion irradiated with the light beam of the readout layer 601 is raised above $T_1$, as long as the temperature of the intermediate layer 503 becomes above Curie temperature $T_3$ and the magnetization in the intermediate layer 503 disappears, and thus the exchange coupling force is not exerted between the intermediate layer 503, the in-plane magnetization in the the readout layer 601 is maintained. As to the material for the readout layer 601, the rear-earth transition metal wherein the content of the rare-earth metal is set greater than that in the compensating composition at room temperature may be used. In the present embodiment, $Gd_{0.28}(Fe_{0.8}Co_{0.2})_{0.72}$ with a thickness of 50 nm is employed.

$T_1$ at which a transition occurs in the readout layer 601 from in-plane magnetization to perpendicular magnetization is preferably set in a range of 40°–70° C. The Curie temperature $T_3$ of the intermediate layer 503 is preferably set in a range of 60°–90° C. The Curie temperature $T_2$ of the recording layer 2 is preferably set in a range of 120°–180° C. Therefore, $T_1$, $T_2$ and $T_3$ satisfy the following inequality:

$$T_1 < T_3 < T_2.$$

When recording on the magneto-optical disk having the above arrangement, first, recording magnetic field is applied onto the magneto-optical disk, and the laser beam 8 of high power is converged onto the magneto-optical disk through the objective lens 9 so as to raise the temperature of the recording layer 2 to the vicinity of Curie temperature $T_2$, thereby forming a recording bit on the recording layer 2.

Next, the reproducing process will be described below with reference to FIGS. 6(a) and (b). FIG. 6(a) is a view of the magneto-optical disk from the laser beam 8 projecting side. FIG. 6(b) is a cross-sectional view taken on the line A—A of FIG. 6(a), which shows respective magnetization states of the magnetic layers 601, 2 and 503.

First, a laser beam 8 with a lower power than that used in recording is projected onto the magneto-optical disk. The laser beam 8 moves with respect to the magneto-optical disk in the direction of arrow Q, and the area 33 (the center of the area 33) on the magneto-optical disk, having a temperature rise above $T_3$ of the readout layer 1 by projecting thereon the laser beam 8 is slightly displaced backward from the area 22 (the center of the area 22) irradiated with the laser beam 8. Therefore, the area 44 (the center of the area 44) having the temperature rise above the Curie temperature $T_3$ of the intermediate layer 503 is slightly displaced backward from the area 22 (the center of the area 22) irradiated with the laser beam 8.

As in the case of the embodiment 5, the intermediate layer 503, magnetization disappears from the area 44 having a temperature above Curie temperature $T_3$, whereas, in other portions of the intermediate layer 503, in-plane magnetization is maintained. The readout layer 601 has perpendicular magnetization in the area 33 having a temperature rise above $T_1$, whereas, has in-plane magnetization in other portions of the readout layer 601. Here, within the area 33 but outside the area 44 of the readout layer 601, exchange coupling force is exerted from the recording layer 2 through the in-plane magnetization in the intermediate layer 503. As a result, the magnetization direction in the readout layer 601 becomes identical with the magnetization direction in the recording layer 2.

In the embodiment 4, in the case where the area 44 of the intermediate layer 303 has in-plane magnetization, the readout layer 401 having a relatively small perpendicular magnetic anisotropy has in-plane magnetization. This is because in the area 44 having the highest temperature of the intermediate layer 303, magnetization becomes smaller with an increase in the temperature, and thus exchange coupling force exerted between the readout layer 401 and the intermediate layer 303 becomes extremely small (see FIG. 4).

In the area 44 wherein magnetization no longer exists in the intermediate layer 503, the information in the form of magnetization direction recorded on the recording layer 2 cannot exert exchange coupling force toward the readout layer 601. Therefore, the portion of the readout layer 601 corresponding to the area 44 is in a free state without being affected by the exchange coupling force from the readout layer 503, and its magnetization is determined by the property of the readout layer 601, i.e., the size of the perpendicular magnetic anisotropy.

The readout layer 601 of the present embodiment has relatively small perpendicular magnetic anisotropy. Therefore, the area 44 of the readout layer 601 wherein exchange coupling force is not exerted from the intermediate layer 503 has in-plane magnetization and does not have the magneto-optical effect with respect to a perpendicular incident light. Therefore, the recording bits 13' and 14' recorded on the recording layer 2 are not reproduced by being masked by the in-plane magnetization in the readout layer 601. In the above arrangement of the present embodiment, in reproducing, the external magnetic field $H_{ex}$ used in the embodiment 5 for arranging the magnetization direction in the readout layer corresponding to the area 44 in the same direction is not required.

As described, in reproducing, the portion having the highest temperature of the magneto-optical disk is slightly displaced backward from the center of the laser beam 8. Therefore, the area 22 irradiated with the laser beam 8 includes a portion of the area 33 having a temperature above $T_1$ at which a transition occurs in the readout layer 601 from in-plane magnetization to perpendicular magnetization and a portion of the area 44 having a temperature above the Curie temperature $T_3$ of the intermediate layer 503. Therefore, the recording bits 14, 14' recorded within the area 33 but outside the area 22 irradiated with the laser beam 8 are not reproduced.

In other portions of the readout layer 601 than the area 33, in-plane magnetization is maintained, and magneto-optical effect is not shown with respect to a perpendicular incident light. Thus, the recording bit 12 recorded within the area 22 irradiated with the laser beam 8 but outside the area 33 is not reproduced.

As described, the only information to be reproduced with the application of the laser beam 8 is the recording bit 13 recorded within the area 22 irradiated with the laser beam 8 and within the area 33 having a temperature above $T_1$ at which a transition occurs from in-plane magnetization to perpendicular magnetization but outside the area 44 having a temperature above $T_3$. Therefore, the magneto-optical disk of the present embodiment permits recorded bits with a size smaller than that of the conventional magneto-optical recording medium to be separately reproduced, thereby achieving a significant improvement in the recording density.

When reproducing the next recorded bit with a shift of the spot of the laser beam 8, the temperature of the portion previously irradiated with the laser beam 8 drops, and a transition occurs in the portion of the readout layer 601 from the perpendicular magnetization to the in-plane magnetization. Accordingly, in the portion having a temperature drop, a magnetic Kerr effect is no more effective. As a result, information recorded on the portion having a temperature drop is not reproduced, thereby preventing the entering of the signal from adjacent bits which is the cause of the generation of noise.

The following will discuss the present embodiment in more detail. First, the manufacturing process of the magneto-optical disk is explained below.

In a sputtering device of the embodiment 1 provided with Al, Gd, Dy, Ho, Fe and Co targets, a transparent disk substrate 4 made of polycarbonate having grooves and pits formed beforehand was placed so as to confront the targets. In the sputtering device, the first transparent dielectric layer 5 made of AlN with a thickness of 60 nm, the readout layer 601 made of $Gd_{0.28}(Fe_{0.8}Co_{0.2})_{0.72}$ with a thickness of 50 nm, the intermediate layer 503 made of $Dy_{0.09}Fe_{0.91}$ with a thickness of 50 nm, the recording layer 2 made of $Dy_{0.23}(Fe_{0.82}Co_{0.18})_{0.72}$ with thickness of 50 nm and the second transparent dielectric layer 6 made of AlN with a thickness of 50 nm were formed in this order as in the same manner as the embodiment 1.

The readout layer 601 made of $Gd_{0.28}(Fe_{0.8}Co_{0.2})_{0.72}$ has in-plane magnetization at room temperature, and a transition occurs to the perpendicular magnetization at temperature above 60° C. ($T_1$=60° C.), and the Curie temperature of the layer was 350° C. The intermediate layer 503 made of $Dy_{0.09}Fe_{0.91}$ has in-plane magnetization at room temperature, and Curie temperature of the layer was 90° C. The recording layer 2 made of $Dy_{0.23}(Fe_{0.82}Co_{0.18})_{0.77}$ is a magnetic thin film with perpendicular magnetization having a compensating temperature at room temperature, and the Curie temperature $T_2$ of the layer was 160° C.

Then, the second transparent dielectric layer 6 was coated with an ultraviolet hardening resin using a spin coat method. Thereafter, ultraviolet ray was projected thereon so as to form the overcoat layer 7 on the second transparent dielectric layer 6. Here, a heat-hardening resin may be used as well for an overcoat layer 7.

The laser beam 8 was converged onto the magneto-optical disk thus manufactured by the objective lens 9, and the disk is rotated at 10 m/s relative linear velocity with respect to the laser beam 8. While the laser beam 8 of 10 mW was being successively projected onto the disk for recording, the modulation magnetic field of ±15 kA/m at 20 MHz frequency was applied onto the magneto-optical disk. As a result, a reverse magnetic domain with a length of 0.25 μm at 0.5 μm period (interval) was formed on the recording layer 2.

Thereafter, the power of the laser beam 8 was reduced to 2 mW so as to reproduce the recorded information. Then, the reproduction signal with 20 MHz frequency was obtained from the readout layer 601, according to the reverse magnetic domain formed on the recording layer 2. In the present embodiment, the constant magnetic field (external magnetic field Hex) used in a reproducing process of the embodiment 5 was not required.

As described, the magneto-optical recording medium of the present embodiment comprises:

a readout layer which has in-plane magnetization at room temperature, and in which a transition occurs from in-plane magnetization to perpendicular magnetization when the temperature of the area irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an intermediate layer formed between the readout layer and the recording layer, which has in-plane magnetization at room temperature, the in-plane magnetization being maintained in a range of room temperature—Curie temperature $T_3$, and wherein the temperatures $T_1$, $T_2$ and $T_3$ satisfy the following inequality:

$T_1 < T_3 < T_2$, and the readout layer has such a small perpendicular magnetic anisotropy that even if the temperature of the portion irradiated with a light beam is raised above $T_1$, the readout layer still has in-plane magnetization as long as the temperature of the intermediate layer is raised above $T_3$, and thus it has in-plane magnetization, and exchange coupling force exerted between the intermediate layer and the readout layer becomes extremely small.

According to the above arrangement, only the bit recorded on the recording layer which satisfy all of the following conditions is subjected to reproduction: 1) recorded within the area irradiated with the light beam; 2) recorded within the area having a temperature above $T_1$; and 3) recorded outside the area having a temperature above $T_3$.

Therefore, the magneto-optical recording medium having the above arrangement permits a reproduction of a recorded bit with a size smaller than the size of the irradiated area with the light beam, thereby significantly improving the recording density. Moreover, when a reproducing operation is carried out from the magneto-optical recording medium of the present embodiment, the external magnetic field required in the embodiment 5 is not required. Thus, the magneto-optical recording medium of the present embodiment does not require the initializing magnetic field when reproducing information and permits a simple structure of the magnetic layers (exchange-coupled triplilayer).

[EMBODIMENT 7]

The following description will discuss the embodiment 7 of the present invention with reference to FIGS. 9–12.

Figure 9:
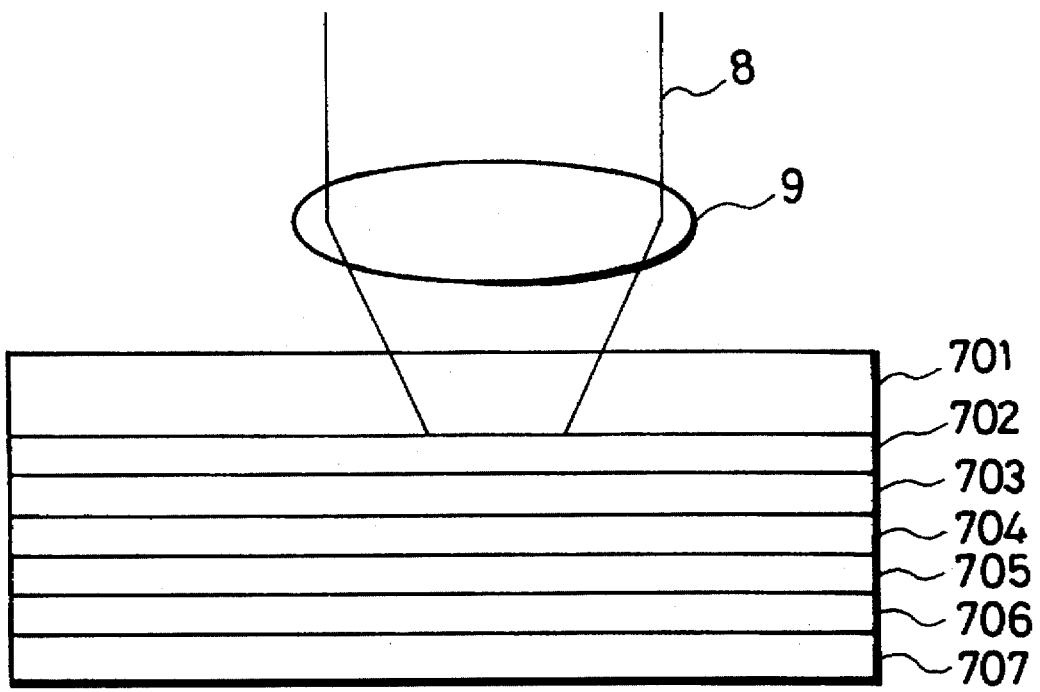
FIG. 9 is an explanatory view showing the configuration of a magneto-optical disk in accordance with the embodiment 7 of the present invention.

As shown in FIG. 9, the magneto-optical disk (magneto-optical recording medium) of the present embodiment is composed of a transparent substrate 701 having a first transparent dielectric layer 702, a first magnetic layer 703, a third magnetic layer 704, a second magnetic layer 705, a second transparent dielectric layer 706, an overcoat layer 707 laminated thereon in this order. An exchange coupling force is exerted among the magnetic layers 703–705.

The transparent substrate 701, the first transparent dielectric film 702, the second transparent dielectric film 706 and the overcoat layer 707 have the same configurations and properties as the transparent substrate 4, the first transparent dielectric layer 5, the second transparent dielectric layer 6 and the overcoat layer 7 of the embodiment 1, thus the detailed descriptions thereof shall be omitted here.

The first magnetic layer 703 has perpendicular magnetization at room temperature, and it is maintained until the temperature thereof is raised to Curie temperature $T_{71}$. The first magnetic layer 703 serves both as a recording layer and as a reproducing layer, and the Curie temperature $T_{71}$ of the first magnetic layer 703 is set above the Curie temperature of the second magnetic layer 705. As to the material for the first magnetic layer 703, rear-earth transition metal such as GdDyFeCo, etc., may be used. Since the reproducing function of the first magnetic layer 703 is important, the Curie temperature $T_{71}$ thereof is preferably set high, and the Kerr rotation angle θk is preferably set large. In the present embodiment, $Gd_{0.10}Dy_{0.13}Fe_{0.54}Co_{0.23}$ with a thickness of 50 nm is used for the first magnetic layer 703. The Curie temperature $T_{71}$ of the $Cd_{0.10}Dy_{0.13}Fe_{0.54}Co_{0.23}$ is high (300° C.), and the Kerr rotation angle θk in the case of applying a laser beam with a wavelength of substantially 800 nm is relatively large (approximately 0.4). Therefore, $Gd_{0.10}Dy_{0.13}Fe_{0.54}Co_{0.23}$ is a suitable material for the reproducing layer.

Suitable material for the first magnetic layer 703 is not limited to GdDyFeCo. For example, GdTbFeCo, TbFeCo, DyFeCo, GdNbFe, NbTbFeCo, Pt/Co or Pd/Co may be used as a preferable material. Especially, in the case where GdNbFe, NbTbFeCo, Pt/Co or Pd/Co is used for the first magnetic layer 703, a greater reproducing ability can be achieved using the reproducing light with a short wavelength. Therefore, with the use of the laser beam having a short wavelength, a beam diameter can be made smaller, thereby achieving a high density recording.

The second magnetic layer 705 has perpendicular magnetization at room temperature, and the perpendicular magnetization is maintained in a range of room temperature—Curie temperature. Since the second magnetic layer 705 is required to serve as a recording layer, the Curie temperature of the second magnetic layer 705 is set to have the lowest Curie temperature among the three magnetic layers 703, 704 and 705. As to the material for the second magnetic layer 705, rare-earth transition metal such as TbFeCo may be used. $Tb_{0.20}Fe_{0.75}Co_{0.05}$ with a thickness of 100 nm is used in the present embodiment. Since $Tb_{0.20}Fe_{0.75}Co_{0.05}$ has relatively low Curie temperature (150° C.), it is suitable for a recording layer.

Suitable material for the second magnetic layer 705 is not limited to TbFeCo; For example, DyFeCo, GdTbFe, TbFe or DyFe may be used as well.

FIG. 11 shows temperature dependencies of the respective coercive forces of the first magnetic layer 703 made of $Gd_{0.10}Dy_{0.13}Fe_{0.54}Co_{0.23}$ and the second magnetic layer 705 made of $Tb_{0.20}Fe_{0.75}Co_{0.05}$.

In recording, an external magnetic field is applied onto the magneto-optical disk. In the present embodiment, the size of the external magnetic field is set at 200 Oe. Thus, temperature at which the magnetization in the second magnetic layer 705 is reversed (hereinafter referred to as the second magnetic layer magnetization reversing temperature) $T_{72}$, i.e., temperature at which the coercive force of the second magnetic layer 705 becomes smaller than the size of the external magnetic field (200 Oe), is set approximately at 145° C.

The third magnetic layer 704 serves as an intermediate layer provided between the first magnetic layer 703 and the second magnetic layer 705 so that exchange coupling force is exerted therebetween. The third magnetic layer 704 has in-plane magnetization at room temperature, and a transition occurs to perpendicular magnetization at temperature above the second magnetic layer magnetization reversing temperature $T_{72}$. As to the material for the third magnetic layer 704, the rare-earth transition metal in which the content of the rare-earth metal is set greater than that in the compensating composition where the magnetic moment of the rear-earth metal and that of the transition metal balance with one another. In the present embodiment, $Gd_{0.23}Fe_{0.46}Co_{0.31}$ with a thickness of 40 nm may be used as the third magnetic layer 704. $Gd_{0.23}Fe_{0.46}Co_{0.31}$ has in-plane magnetization at room temperature, and temperature $T_{73}$ at which a transition occurs to perpendicular magnetization is 170° C. The perpendicular magnetization is maintained in a range of $T_{73}$–300° C.

In the present embodiment, the first transparent dielectric layer 702 made of AlN with a thickness of 80 nm, the second transparent dielectric layer 706 made of AlN with a thickness of 50 nm, the overcoat layer 707 made of ultraviolet hardening resin film are used.

In the above arrangement, information is recorded on a magneto-optical disk by applying thereto an external magnetic field with the size of 200 Oe onto the magneto-optical disk. In the meantime, the laser beam 8 having high power is converged onto the magneto-optical disk through the objective lens 9 to be projected onto the magneto-optical disk so as to raise the temperature of the second magnetic layer 705 is raised to the vicinity of Curie temperature as shown in FIG. 7.

Figure 10:
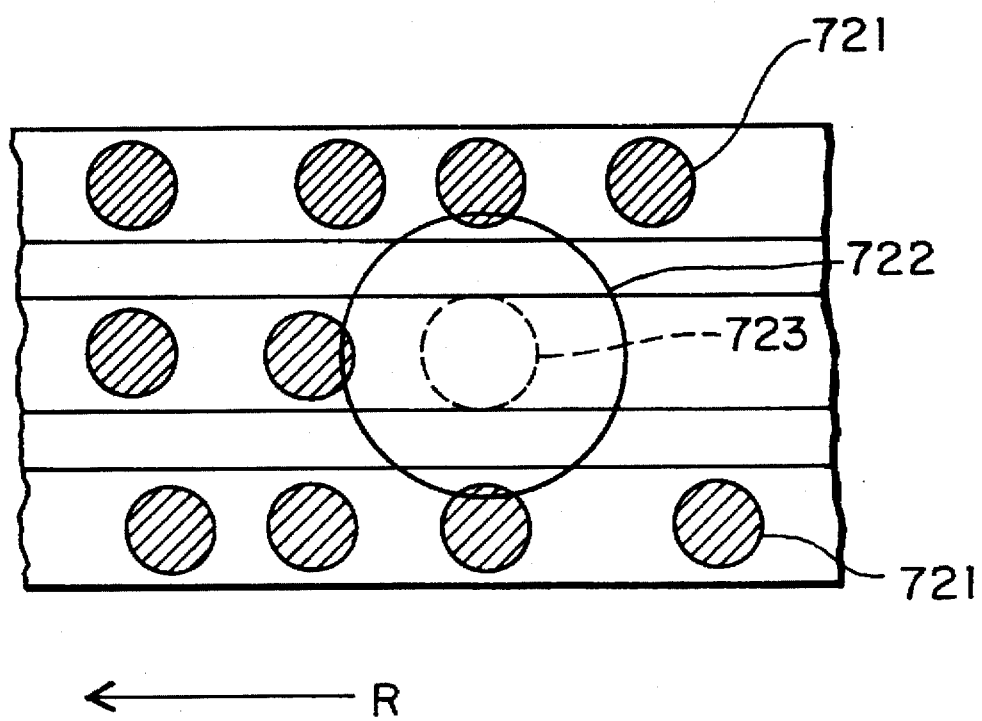
FIG. 10 is an explanatory view showing the relative relationship among a information bit pattern formed on the magneto-optical disk of FIG. 9, the area wherein the magnetization is reversed by projecting thereon a laser beam of the second magnetic layer and the area which has perpendicular magnetization in the third magnetic layer.
Figure 10:
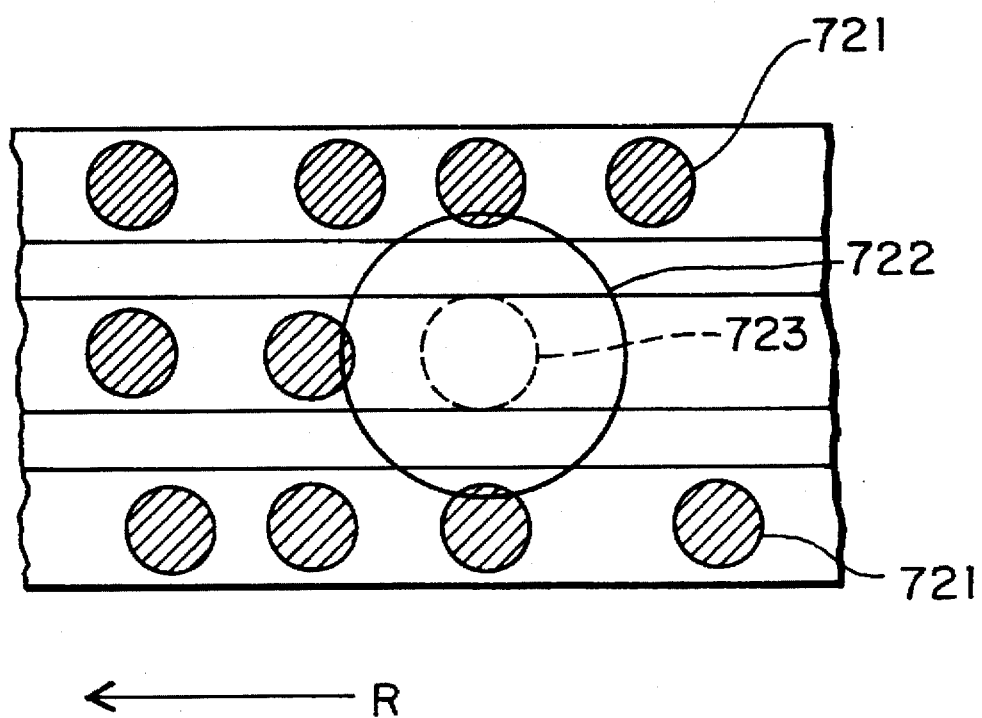

FIG. 10 shows relative relationships among recording bits 721 formed on the track; the area having a temperature rise above the second magnetic layer magnetization reversing temperature $T_{72}$ with the projection of the laser beam 8 and thus the magnetization is reversed in the second magnetic layer 705 (hereinafter referred to as the second magnetic layer magnetization reversing area) 722; and an area 723 having a temperature rise above $T_{73}$ at which transition occurs in the third. magnetic layer 704 from in-plane magnetization to perpendicular magnetization, and thus the third magnetic layer 704 has perpendicular magnetization (hereinafter referred to as the third magnetic layer perpendicular magnetization area) 723. For convenience in the explanation, it is assumed here that information is already stored on both tracks adjacent to the track whereon recording of information is being carried out, and the stored information is designated by a black bit pattern of FIG. 10. Additionally, the magneto-optical disk is moved in the direction of arrow R with respect to the laser beam 8.

When the laser beam 8 is projected in the presence of the external magnetic field, the magnetization in the second magnetic layer 705 is reversed in the second magnetic layer magnetization reversing area 722, thereby forming a recording bit on the second magnetic layer 705.

The recording bit formed on the second magnetic layer 705 is finally copied and stored magnetically on the first magnetic layer 703 by exchange coupling force exerted through the third magnetic layer 704. In practice, magnetic transfer between the second magnetic layer 705 and the first magnetic layer 703 are carried out only in the area which has perpendicular magnetization in the third magnetic layer 704 provided between the magnetic layers 703 and 705. While the third magnetic layer 704 has in-plane magnetization, exchange coupling force exerted between the first magnetic layer 703 and the second magnetic layer 705 becomes extremely small, and thus the magnetization in the second magnetic layer 705 is not copied to the first magnetic layer 703.

Here, $T_{73}$ at which transition occurs in the third magnetic layer 704 from in-plane magnetization to perpendicular magnetization is set higher than the second magnetic layer magnetization reversing temperature Since the third magnetic layer perpendicular magnetization area 723 is smaller than the second magnetic layer magnetization reversing area 722, the resulting recording bit formed on the first magnetic layer 703 is smaller than the recording bit formed on the second magnetic layer 705.

As shown in the figure, in recording, due to thermal diffusion in lateral and track directions, the magnetization reversing area 722 of the second magnetic layer 705 which serves as a recording layer extends to the adjacent track whereon information is already stored or the bit recorded directly before. As a result, the magnetization in the recorded area of the second magnetic layer 705 is disturbed.

However, the area where the magnetization is disturbed of the second magnetic layer 705 is masked by the in-plane magnetization in the third magnetic layer 704, and the magnetization is nor copied to the first magnetic layer 703. Therefore, in the arrangement of the magneto-optical disk of the present embodiment, thermal interference generated in the second magnetic layer 705 does not affect the first magnetic layer 703 for recording thereon information. Thus, the information recorded on the first magnetic layer 703 can be prevented from being disturbed, thereby achieving a reliable high density recording of the recording bit on the first magnetic layer 703 of the magneto-optical disk.

Figure 12:
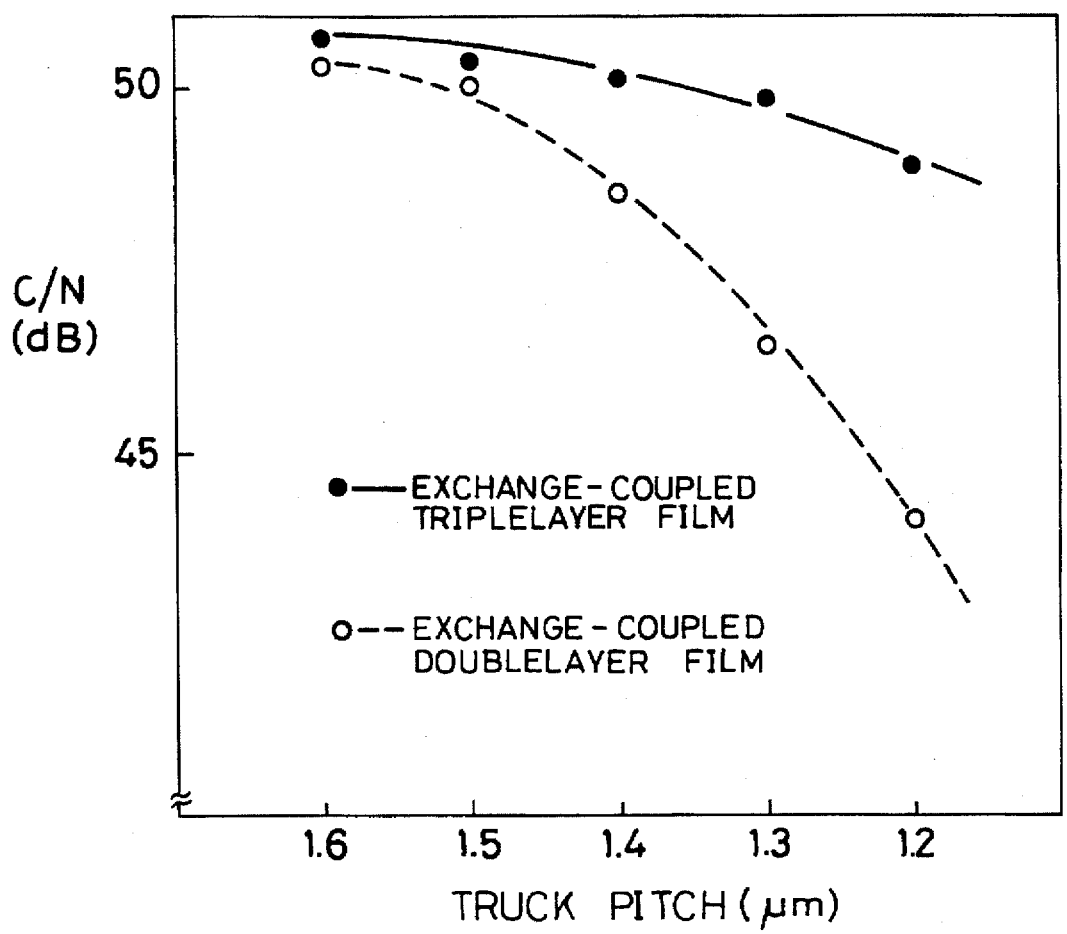
FIG. 12 is a graph showing respective relationships between the track pitch and a change in C/N of the reproducing signal of the magneto-optical disk having exchange coupled triplilayer film structure of FIG. 9 and the magneto-optical disk having the configuration of FIG. 9 excluding the third magnetic layer.

Information was actually recorded on the magneto-optical disk of the present embodiment and on a magneto-optical disk having the same configuration of that of the present embodiment except that the third magnetic layer 704 is not provided as a comparison example under the condition shown in the following Table 1. FIG. 12 shows a change in C/N (carrier to noise ratio) of the reproducing signal with respect to the track pitch when reproducing the information recorded on the respective magneto-optical disks under the conditions shown in Table 1. In the figure, the results obtained using the magneto-optical disk of the present invention is shown by the solid line, whereas, the results obtained using the magneto-optical disk without the third magnetic layer 704 are shown by a dotted line.

TABLE 1

| | |
|---|---|
| Wavelength of a reproducing laser beam | 830 nm |
| Numerical aperture of the objective lens | 0.53 |
| Recording power | 4.0 mW |
| Reproducing power | 0.7 mW |
| Linear velocity | 1.2 m/s |
| groove width | 0.9 μm |
| track pitch | 1.6 μm–1.2 μm |
| size of the external subsidiary magnetic field | 200 Oe |

As can be seen from the figure, as the recording density is increased by making the width of the track pitch smaller, when recording on the conventional magneto-optical disk without the third magnetic layer 704 (exchange-coupled double layer), the C/N ratio of the reproducing signal is reduced to a great degree due to an effect from crosstalk between the adjacent tracks. On the other hand, when recording on the magneto-optical disk of the present embodiment having an exchange-coupled triplilayer structure, cross-talk between the adjacent tracks can be suppressed, thereby preventing a reduction in the C/N of the reproducing signal even in the case of a high density recording.

Using the magneto-optical disk of the present embodiment, an improvement in the recording density can be achieved without increasing the load on the side of the device system.

As described, the magneto-optical recording medium of the present invention comprises:

a first magnetic layer which has perpendicular magnetization at room temperature, the perpendicular magnetization being maintained in a temperature range of room temperature—Curie temperature $T_{71}$;

a second magnetic layer which has perpendicular magnetization at room temperature, the perpendicular magnetization being maintained in a temperature range of room temperature—Curie temperature that is lower than Curie temperature $T_{71}$ of the first magnetic layer; and a third magnetic layer which has in-plane magnetization at room temperature, whereas, at a temperature higher that a second magnetic layer magnetization reversing temperature at which the magnetization direction in the second magnetic layer is reversed by projecting a light beam in the presence of an external magnetic field, a transition occurs from in-plane magnetization to perpendicular magnetization.

According to the above arrangement, by projecting a light beam in the presence of an external magnetic field (recording magnetic field), the recording bit formed on the second magnetic layer is finally copied and recorded magnetically on the first magnetic layer by exchange coupling force exerted thereto through the perpendicular magnetization in the third magnetic layer. When a thermal interference occurs to the adjacent bits formed on the same track or adjacent tracks due to a thermal diffusion, the magnetization in the bits already recorded on the second magnetic layer may be disturbed. However, in the arrangement of the present embodiment, the portion where the magnetization state is disturbed of the second magnetic layer is masked by the in-plane magnetization in the third magnetic layer, and thus the disturbed magnetization is not copied magnetically onto the first magnetic layer. In recording on the magneto-optical recording medium of the present embodiment, adverse effects to the adjacent bits due to a thermal interference can be avoided even if with a narrower track pitch, or shorter recording bits period, thereby achieving a significant improvement in the recording density.

[EMBODIMENT 8]

Figure 13:
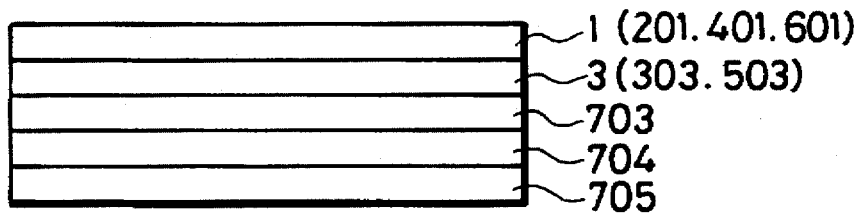
FIG. 13 is an explanatory view showing the configuration of the magneto-optical disk in accordance with the embodiment 8 of the present invention.
Figure 14:
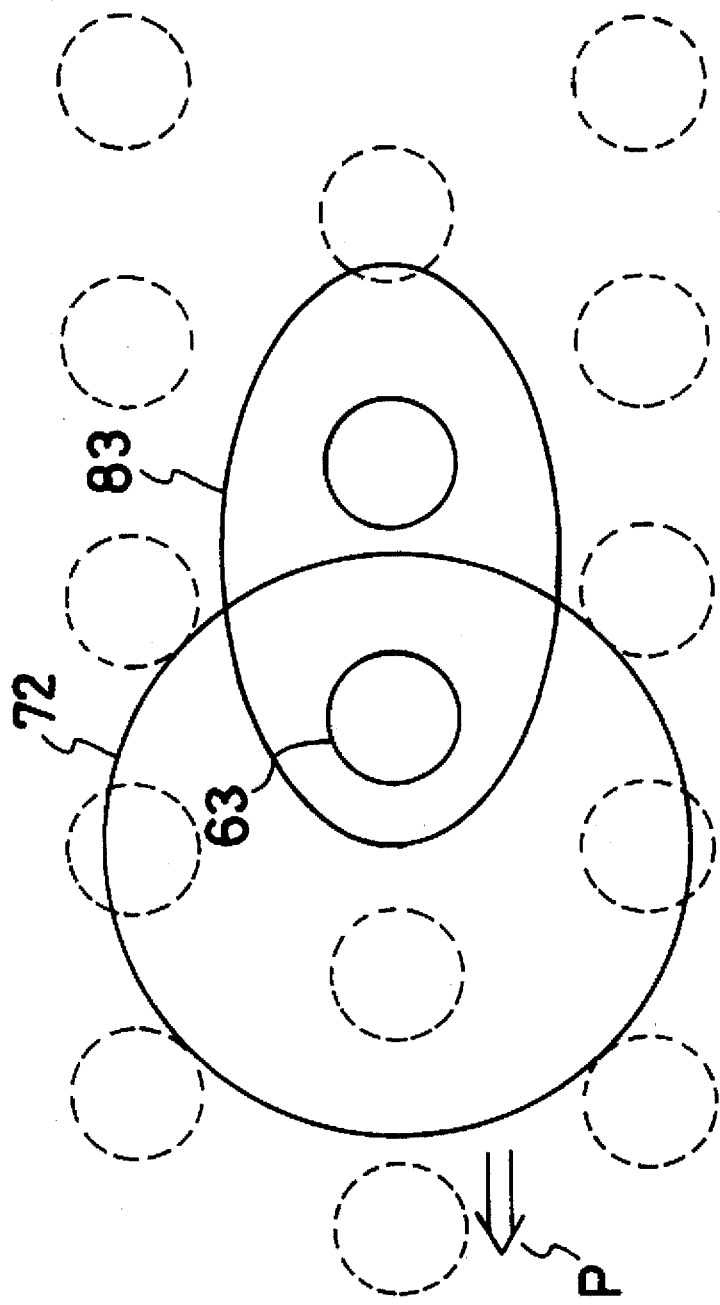
FIG. 14 is an explanatory view showing the state in reproducing information of the conventional magneto-optical disk.
Figure 15:
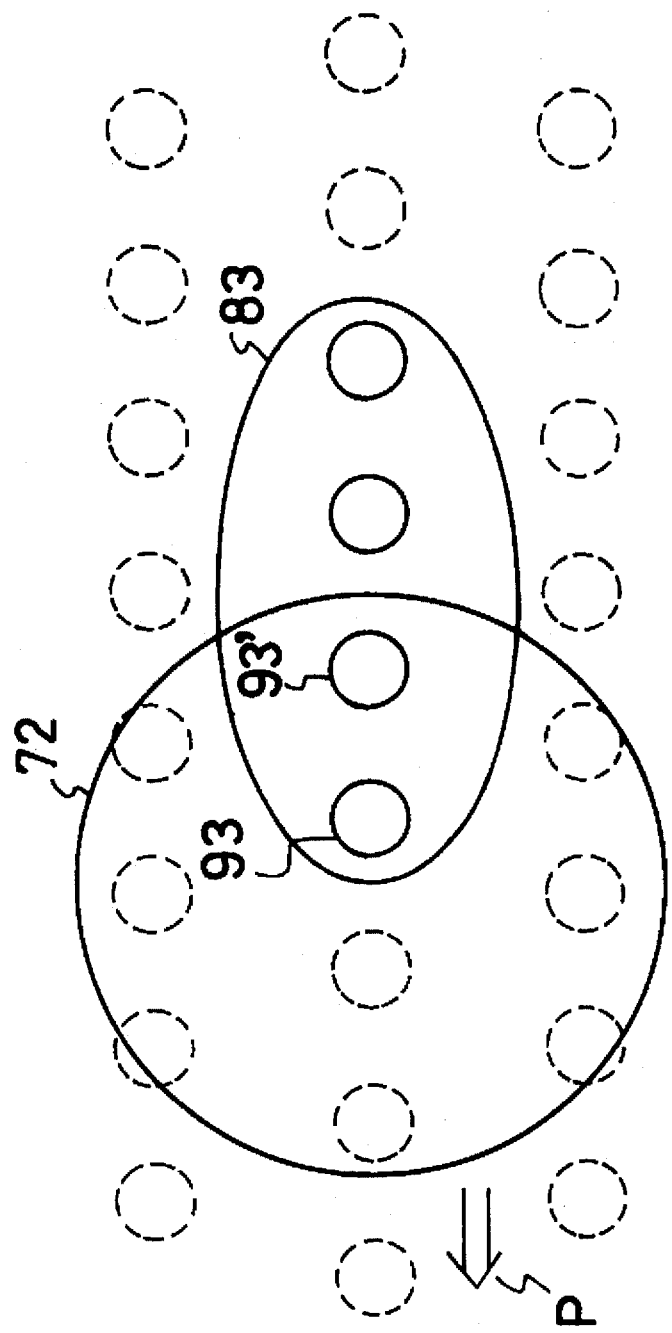
FIG. 15 is an explanatory view showing the state in reproducing information recorded at higher density of the magneto-optical disk compared with the conventional magneto-optical disk.

The following description will discuss the embodiment 8 of the present invention in reference to FIG. 13. For convenience, members having the same configuration and function as those of the embodiments 1–7 are designated by the same codes, and the explanations thereof shall be omitted here.

As shown in FIG. 13, in a magneto-optical disk (magneto-optical recording medium) of the present embodiment, the first through third magnetic layers 703–705 of the embodiment 7 are used only as a recording layer, and the intermediate layer and the readout layer used in the embodiments 1–6 are laminated on the first magnetic layer 703 in this order, and thus the magneto-optical disk of the present embodiment has an exchange-coupled five layered structure.

Specifically, in the exchange-coupled triplilayer structure of the embodiment 7, in practice, since the first magnetic layer 703 stores the information recorded at high density, in the arrangement of the present embodiment, the first magnetic layer 703 does not function as a readout layer but functions only as a recording layer in lieu of the recording layer used in the embodiments 1–6.

Namely, on the first magnetic layer 703 of the three magnetic layers of the embodiment 7, the intermediate layer 3 and the readout layer 1 of the embodiment 1 are laminated in this order. Here, $T_1$ at which a transition occurs in the readout layer 1 from in-plane magnetization to perpendicular magnetization, Curie temperature $T_{71}$ of the first magnetic layer 703 and Curie temperature $T_3$ of the intermediate layer 3 satisfy the following inequality:

$$T_1 < T_3 < T_{71}.$$

Alternatively, on the first magnetic layer 703 of the three magnetic layers of the embodiment 7, the intermediate layer 3 and the readout layer 201 of the embodiment 2 are laminated in this order. Here, $T_1$ at which a transition occurs in the readout layer 201 from in-plane magnetization to perpendicular magnetization, Curie temperature $T_{71}$ of the first magnetic layer 703 and Curie temperature $T_3$ of the intermediate layer 3 satisfy the following inequality:

$$T_1 < T_3 < T_{71}.$$

Alternatively, on the first magnetic layer 703 of the three magnetic layers of the embodiment 7, the intermediate layer 303 and the readout layer 1 of the embodiment 3 are laminated in this order. Here, $T_1$ at which a transition occurs in the readout layer 1 from in-plane magnetization to perpendicular magnetization, Curie temperature $T_{71}$ of the first magnetic layer 703 and $T_3$ at which a transition occurs in the intermediate layer 303 from perpendicular magnetization to in-plane magnetization satisfy the following inequality:

$$T_1 < T_3 < T_{71}.$$

Alternatively, on the first magnetic layer 703 of the three magnetic layers of the embodiment 7, the intermediate layer 303 and the readout layer 401 of the embodiment 4 are laminated in this order. Here, $T_1$ at which a transition occurs in the readout layer 401 from in-plane magnetization to perpendicular magnetization, Curie temperature $T_{71}$ of the first magnetic layer 703 and $T_3$ at which a transition occurs in the intermediate layer 303 from perpendicular magnetization to in-plane magnetization satisfy the following inequality:

$$T_1 < T_3 < T_{71}.$$

Alternatively, on the first magnetic layer 703 of the three magnetic layers of the embodiment 7, the intermediate layer 503 and the readout layer 1 of the embodiment 5 are laminated in this order. Here, $T_1$ at which a transition occurs in the readout layer 1 from in-plane magnetization to perpendicular magnetization, Curie temperature $T_{71}$ of the first magnetic layer 703 and Curie temperature $T_3$ of the intermediate layer 503 satisfy the following inequality:

$$T_1 < T_3 < T_{71}.$$

Alternatively, on the first magnetic layer 703 of the three magnetic layers of the embodiment 7, the intermediate layer 503 and the readout layer 601 of the embodiment 6 are laminated in this order. Here, $T_1$ at which a transition occurs in the readout layer 601 from in-plane magnetization to perpendicular magnetization, Curie temperature $T_{71}$ of the first magnetic layer 703 and Curie temperature $T_3$ of the intermediate layer 503 satisfy the following inequality.

$$T_1 < T_3 < T_{71}.$$

The magneto-optical recording medium having an exchange-coupled five layer structure permits an improvement in the resolution in reproducing as in the case of the previous embodiments 1–6. Moreover, an effect of the embodiment 7, i.e., an adverse effect on the adjacent recording bits due to the thermal interference can be avoided in recording can be achieved as well, thereby achieving a high density recording of the information.

In the above embodiments 1 through 8, explanations are given through the case of the magneto-optical disk as a magneto-optical recording medium, the present invention is not limited to this. For example, the present invention is preferably applicable to a magneto-optical tape, a magneto-optical card, etc..

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:
   a substrate which is transmissive to laser light;
   a magnetic film formed on said substrate, said magnetic film including:
      a readout layer which has in-plane magnetization at room temperature, and in which a transition occurs in a portion subjected to a temperature rise to above a first temperature $T_1$ from in-plane magnetization to perpendicular magnetization when temperature of said portion is raised above $T_1$;
      a recording layer having a Curie temperature of a second temperature $T_2$ for recording thereon information magneto-optically, which has perpendicular magnetization at room temperature, the perpendicular magnetization being maintained in a temperature range from room temperature to Curie temperature $T_2$; and
      an intermediate layer formed between said readout layer and said recording layer, said intermediate layer structured so that an exchange coupling force exerted between said recording layer and said readout layer passes through said intermediate layer in an area having a temperature below a third temperature $T_3$, and said exchange coupling force is masked by said intermediate layer in an area having a temperature above $T_3$, and wherein said temperatures $T_1$, $T_2$ and $T_3$ satisfy the following inequality:

$$T_1 < T_3 < T_2.$$

2. The magneto-optical recording medium as set forth in claim 1, wherein:

the Curie temperature of said intermediate layer is equal to $T_3$, and said intermediate layer has a perpendicular magnetization at room temperature, the perpendicular magnetization being maintained in a temperature range between room temperature and the Curie temperature $T_3$.

3. The magneto-optical recording medium as set forth in claim 1, wherein:

said intermediate layer has a perpendicular magnetization at room temperature, while a transition occurs therein from the perpendicular magnetization to an in-plane magnetization at temperatures above $T_3$.

4. The magneto-optical recording medium as set forth in claim 1, wherein:

a readout layer which has in-plane magnetization at room temperature, and in which a transition occurs from in-plane magnetization to perpendicular magnetization when temperature of a portion irradiated with a light beam is raised above $T_1$;

a recording layer for recording thereon information magneto-optically, which has perpendicular magnetization at room temperature, the perpendicular magnetization being maintained in a range of room temperature—Curie temperature $T_2$; and an itermediate layer formed between said readout layer and said recording layer, which has in-plane magnetization at room temperature, the in-plane magnetization being maintained in a range of room temperature—Curie temperature $T_3$, and wherein said temperatures $T_1$, $T_2$, and $T_3$ satisfy the following inequality:

$$T_1 < T_3 < T_2$$

Curie temperature of said intermediate layer is equal to $T_3$, and said intermediate layer has an in-plane magnetization at room temperature, the in-plane magnetization being maintained in a temperature range between room temperature and Curie temperature $T_3$.

5. The medium of claim 1 further structured so that the recording layer has a higher coercive force at room temperature, as compared to the readout and intermediate layers.

6. The medium of claim 1 further structured so that at temperatures between T1 and T3, the coercive forces of the readout and intermediate layers are substantially equal.

7. The medium of claim 1, wherein said recording layer and said intermediate layer are always exchange-coupled at room temperature.

8. The medium of claim 1, wherein the Curie temperature of said readout layer is higher than the Curie temperature of said recording layer.

9. The magneto-optical recording medium as set forth in claim 1, wherein:

the Curie temperature of said intermediate layer is equal to $T_3$, and said intermediate layer has an in-plane magnetization at room temperature, the in-plane magnetization being maintained in a temperature range between room temperature and Curie temperature $T_3$.

10. The magneto-optical recording medium as set forth in claim 2, wherein:

said readout layer comprises a rare-earth transition metal alloy in which the content of rare-earth metal is set greater than that in its compensating composition at room temperature where, in said alloy, the magnetic moment of the rare-earth metal and the magnetic moment of the transition metal balance with one another so that said readout layer has in-plane magnetization at room temperature and a transition occurs from in-plane magnetization to perpendicular magnetization when the temperature of said portion is raised above $T_1$.

11. The magneto-optical recording medium as set forth in claim 2, wherein said intermediate layer comprises HoFeCo.

12. The magneto-optical recording medium as set forth in claim 2, wherein said intermediate layer comprises DyFe.

13. The magneto-optical recording medium as set forth in claim 2, wherein said recording layer comprises DyFeCo.

14. The magneto-optical recording medium as set forth in claim 2, wherein:

said readout layer has such a small perpendicular magnetic anisotropy that even if the temperature of a portion irradiated with the laser light beam is raised above $T_1$, said readout layer still has in-plane magnetization as long as the temperature of said intermediate layer is above $T_3$.

15. The magneto-optical recording medium as set forth in claim 2, wherein:

$T_1$ at which a transition occurs in said readout layer from in-plane magnetization to perpendicular magnetization is set in a range of 40°–70° C.;

the Curie temperature $T_3$ of said intermediate layer is set in a range of 60°–90° C.; and the Curie temperature $T_2$ of said recording layer is set in a range of 120°–180° C.

16. The magnetic-optical recording medium as set forth in claim 2 wherein the medium is, selected from the group consisting of a magneto-optical disk, a magneto-optical tape and magneto-optical card.

17. The magneto-optical recording medium as set forth in claim 3, wherein:

said readout layer comprises a rare-earth transition metal alloy in which the content of rare-earth metal is set greater than that in its compensating composition at room temperature where, in said alloy, the magnetic moment of the rare-earth metal and the magnetic moment of the transition metal balance with one another so that said readout layer has in-plane magnetization at room temperature and a transition occurs from in-plane magnetization to perpendicular magnetization when the temperature of said portion is raised above $T_1$.

18. The magnetic-optical recording medium as set forth in claim 3, wherein said intermediate layer comprises DyFeCo.

19. The magneto-optical recording medium as set forth in claim 3, wherein said recording layer comprises DyFeCo.

20. The magneto-optical recording medium as set forth in claim 3, wherein:

said readout layer has such a small perpendicular magnetic anisotropy that even if the temperature of a portion irradiated with the laser light beam is raised above $T_1$, said readout layer still has in-plane magnetization as long as the temperature of said intermediate layer is above $T_3$.

21. The magnetic-optical recording medium as set forth in claim 3, wherein:

$T_1$ at which a transition occurs in said readout layer from in-plane magnetization to perpendicular magnetization is in a range of 40°–70° C.;

$T_3$ at which a transition occurs in said intermediate layer from perpendicular magnetization to in-plane magnetization is in a range of 60°–90° C.; and the Curie temperature $T_2$ of said recording layer is in a range of 120°–180° C.

22. The magnetic-optical recording medium as set forth in claim 3, wherein the medium is selected from the group consisting of a magneto-optical disk, a magnetic-optical tape and a magnetic-optical card.

23. The magnetic-optical recording medium as set forth in claim 4, wherein said intermediate layer comprises DyFe.

24. The magnetic-optical recording medium as set forth in claim 4, wherein said recording layer comprises DyFeCo.

25. The magneto-optical recording medium as set forth in claim 9, wherein:

said readout layer comprises a rare-earth transition metal alloy in which the content of rare-earth metal is set greater than that in its compensating composition at room temperature where, in said alloy, the magnetic moment of the rare-earth metal and the magnetic moment of the transition metal balance with one another so that said readout layer has in-plane magnetization at room temperature and a transition occurs from in-plane magnetization to perpendicular magnetization when the temperature of said portion is raised above $T_1$.

26. The magneto-optical recording medium as set forth in claim 1, wherein:

said readout layer has such a small perpendicular magnetic anisotropy that even if the temperature of a portion irradiated with the laser light beam is raised above $T_1$, said readout layer still has in-plane magnetization as long as the temperature of said intermediate layer is above $T_3$.

27. The magneto-optical recording medium as set forth in claim 9, wherein:

$T_1$ at which a transition occurs in said readout layer from in-plane magnetization to perpendicular magnetization is in a range of 40°–70° C.;

the Curie temperature $T_3$ of said intermediate layer is in a range of 60°–90° C.; and the Curie temperature $T_2$ of said recording layer is in a range of 120°–180° C.

28. The magneto-optical recording medium as set forth in claim 9, wherein the medium is selected from the group consisting of a magneto-optical disk, a magneto-optical tape and a magneto-optical card.

29. The magnetic-optical recording medium as set forth in claim 10, wherein said readout layer comprises DyFeCo.

30. The magnetic-optical recording medium as set forth in claim 29, wherein said readout layer comprises $Dy_{0.35}(Fe_{0.5}Co_{0.5})_{0.65}$.

31. The magnetic-optical recording medium as set forth in claim 11, wherein said intermediate layer comprises $Ho_{0.28}(Fe_{0.85}Co_{0.15})_{0.72}$.

32. The magnetic-optical medium as set forth in claim 12, wherein said intermediate layer comprises $Dy_{0.21}Fe_{0.79}$.

33. The magnetic-optical recording medium as set forth in claim 13, wherein said recording layer comprises $Dy_{0.23}(Fe_{0.82}Co_{0.18})_{0.77}$.

34. The magneto-optical recording medium as set forth in claim 14, wherein:

said readout layer comprises a rare-earth transition metal alloy in which the content of rare-earth metal is set greater than that in its compensating composition at room temperature where, in said alloy, the magnetic moment of the rare-earth metal and the magnetic moment of the transition metal balance with one another so that said readout layer has in-plane magnetization at room temperature and a transition occurs from in-plane magnetization to perpendicular magnetization when the temperature of said portion is raised above $T_1$.

35. The magneto-optical recording medium as set forth in claim 34, wherein said readout layer comprises GdFeCo.

36. The magneto-optical recording medium as set forth in claim 35, wherein said readout layer comprises $Gd_{0.28}(Fe_{0.8}Co_{0.2})_{0.72}$.

37. The magnetic-optical recording medium as set forth in claim 17, wherein said readout layer comprises DyFeCo.

38. The magneto-optical recording medium as set forth in claim 37, wherein said intermediate layer comprises $Dy_{0.35}(Fe_{0.5}Co_{0.5})_{0.65}$.

39. The magneto-optical recording medium as set forth in claim 18, wherein said intermediate layer comprises $Dy_{0.13}(Fe_{0.5}Co_{0.5})_{0.87}$.

40. The magneto-optical recording medium as set forth in claim 13, wherein said recording layer comprises $Dy_{0.23}(Fe_{0.82}Co_{0.18})_{0.77}$.

41. The magnetic-optical recording medium as set forth in claim 20, wherein:

said readout layer comprises a rare-earth transition metal alloy in which the content of rare-earth metal is set greater than that in its compensating composition at room temperature where, in said alloy, the magnetic moment of the rare-earth metal and the magnetic moment of the transition metal balance with one another so that said readout layer has a in-plane magnetization at room temperature and a transition occurs from in-plane magnetization to perpendicular magnetization when the temperature of said portion is raised above $T_1$.

42. The magneto-optical recording medium as set forth in claim 41, wherein said readout layer comprises GdFeCo.

43. The magneto-optical recording medium as set forth in claim 42, wherein said readout layer comprises $Gd_{0.28}(Fe_{0.8}Co_{0.2})_{0.72}$.

44. The magneto-optical recording medium as set forth in claim 25, wherein said readout layer comprises DyFeCo.

45. The magneto-optical recording medium as set forth in claim 44, wherein said readout layer comprises $Dy_{0.35}(Fe_{0.5}Co_{0.5})_{0.65}$.

46. The magnetic-optical recording medium as set forth in claim 23, wherein said intermediate layer comprises $Dy_{0.09}Fe_{0.91}$.

47. The magnetic-optical recording medium as set forth in claim 24, wherein said recording layer comprises $Dy_{0.23}(Fe_{0.82}Co_{0.18})_{0.77}$.

48. The magnetic-optical recording medium as set forth in claim 26, wherein:

said readout layer comprises a rare-earth transition metal alloy in which the content of rare-earth metal is set greater than that in its compensating composition at room temperature where, in said alloy, the magnetic moment of the rare-earth metal and the magnetic moment of the transition metal balance with one another so that said readout layer has in-plane magnetization at room temperature and a transition occurs from in-plane magnetization to perpendicular magnetization when the temperature of said portion is raised above $T_1$.

49. The magnetic-optical recording medium as set forth in claim 48, wherein said readout layer comprises GdFeCo.

50. The magnetic-optical recording medium as set forth in claim 49, wherein said readout layer comprises $Gd_{0.28}(Fe_{0.8}Co_{0.2})_{0.72}$.

51. A magnetic-optical recording medium comprising:

a transparent substrate, transparent to laser light;

a first transparent dielectric layer, transparent to laser light, formed on said transparent substrate, for enhancing a magnetic Kerr rotation angle, said first transparent dielectric layer having a thickness of a value obtained by dividing a quarter of a wavelength of a reproducing laser light beam by a reflective index of said first transparent dielectric layer;

a readout layer formed on said first transparent dielectric layer, said readout layer having in-plane magnetization at room temperature, and in which a transition occurs in a portion subjected to a temperature rise above a first temperature $T_1$ from in-plane magnetization to perpendicular magnetization when the temperature of said portion is raise above $T_1$;

an intermediate layer, having a Curie temperature of a third temperature $T_3$ and being formed on said readout layer, which has in-plane magnetization at room temperature, the in-plane magnetization being maintained in a temperature range of room temperature to Curie temperature $T_3$;

a recording layer, having a Curie temperature of a second temperature $T_2$ and being formed on said intermediate layer, for recording thereon information magneto-optically, which has perpendicular magnetization at room temperature, the perpendicular magnetization being maintained in a temperature range of room temperature to Curie temperature $T_2$;

a second transparent dielectric layer, transparent to light, formed on said recording layer, for protecting said recording layer;

an overcoat layer formed on said second transparent dielectric layer, for protecting said second transparent dielectric layer; and wherein said temperature $T_1$, $T_2$ and $T_3$ satisfy the following inequality:

$$T_1 < T_3 < T_2.$$

52. The magneto-optical recording medium as set forth in claim 51, wherein:

said intermediate layer being structured so that an exchange coupling force exerted between said recording layer and said readout layer passes through said intermediate layer in an area having a temperature below the third temperature $T_3$, and said exchange coupling force is masked by said intermediate layer in an area having a temperature above $T_3$.

53. A magneto-optical recording medium comprising:

a transparent substrate, transparent to laser light;

a first transparent dielectric layer, transparent to laser light, formed on said transparent substrate, for enhancing a magnetic Kerr rotation angle, said first transparent dielectric layer having a thickness of a value obtained by dividing a quarter of a wavelength of a reproducing laser light beam by a reflective index of said first transparent dielectric layer;

a readout layer formed on said first transparent dielectric layer, said readout layer has in-plane magnetization at room temperature, and in which a transition occurs in a portion subjected to a temperature rise above a first temperature $T_1$ from in-plane magnetization to perpendicular magnetization when the temperature of said portion is raise above $T_1$;

an intermediate layer formed on said readout layer, which has perpendicular magnetization at room temperature, the perpendicular magnetization being maintained in a temperature range of room temperature to Curie temperature a recording layer, having a Curie temperature of a second temperature $T_2$, formed on said intermediate layer, for recording thereon information magneto-optically, which has perpendicular magnetization at room temperature, the perpendicular magnetization being maintained in a temperature range of room temperature to Curie temperature $T_2$;

a second transparent dielectric layer, transparent to laser light, formed on said recording layer, for protecting said recording layer;

an overcoat layer provided on said second transparent dielectric layer, for protecting said second transparent dielectric layer;

said intermediate layer structured so that an exchange coupling force exerted between said recording layer and said readout layer passes through said intermediate layer in an area having a temperature below a third temperature $T_3$, and said exchange coupling force is masked by said intermediate layer in an area having a temperature above $T_3$; and wherein said temperatures $T_1$, $T_2$ and $T_3$ satisfy the following inequality:

$$T_1 < T_3 < T_2.$$

54. A magneto-optical recording medium comprising:

a transparent substrate, transparent to laser light;

a first transparent dielectric layer, transparent to laser light, formed on said transparent substrate, for enhancing a magnetic Kerr rotation angle, said first transparent dielectric layer having a thickness of a value obtained by dividing a quarter of a wavelength of a reproducing laser light beam by a reflective index of said first transparent dielectric layer;

a readout layer formed on said first transparent dielectric layer, said readout layer having in-plane magnetization at room temperature, and in which a transition occurs in a portion subjected to a temperature rise above a first temperature $T_1$ from in-plane magnetization to perpendicular magnetization when the temperature of said portion is raise above $T_1$;

an intermediate layer formed on said readout layer, said intermediate layer having perpendicular magnetization at room temperature, and in which a transition occurs in a portion subjected to a temperature rise above a third temperature $T_3$ from perpendicular magnetization to in-plane magnetization when the temperature of said portion is raised above $T_3$;

a recording layer, having a Curie temperature of a second temperature $T_2$ and being formed on said intermediate layer, for recording thereon information magneto-optically, which has perpendicular magnetization at room temperature, the perpendicular magnetization being maintained in a temperature range of room temperature to the Curie temperature $T_2$;

a second transparent dielectric layer, transparent to light, formed on said recording layer, for protecting said recording layer;

an overcoat layer provided on said second transparent dielectric layer, for protecting said second transparent dielectric layer; and wherein said temperatures $T_1$, $T_2$ and $T_3$ satisfy the following inequality:

$T_1 < T_3 < T_2$.

55. The magneto-optical recording medium as set forth in claim 54, wherein:

said intermediate layer being structured so that an exchange coupling force exerted between said recording layer and said readout layer passes through said intermediate layer in an area having a temperature below the third temperature $T_3$, and said exchange coupling force is masked by said intermediate layer in an area having a temperature above $T_3$.

56. An information reproducing system comprising a magneto-optical recording medium whereon information is recorded, and a reproducing device for reproducing information recorded on said magneto-optical recording medium, said magneto-optical recording medium including:

a substrate which is transmissive to a laser light beam;

a magnetic film formed on said substrate, said magnetic film including:

a readout layer which has in-plane magnetization at room temperature, and in which a transition occurs in a portion subjected to a temperature rise to above a first temperature $T_1$ from in-plane magnetization to perpendicular magnetization when temperature of said portion is raised above $T_1$;

a recording layer having a Curie temperature of $T_2$ for recording thereon information magneto-optically, which has perpendicular magnetization at room temperature, the perpendicular magnetization being maintained in a range from room temperature to Curie temperature $T_2$; and an intermediate layer formed between said readout layer and said recording layer, said intermediate layer structured so that an exchange coupling force exerted between said recording layer and said readout layer passes through said intermediate layer in an area having a temperature below $T_3$, and said exchange coupling force is masked by said intermediate layer in an area having a temperature above $T_3$, wherein said temperatures $T_1$, $T_2$ and $T_3$ satisfy the following inequality:

$T_1 < T_3 < T_2$, and said magnetic film is arranged such that when the temperature of said portion is raised, the magnetization information on said recording layer is copied to said readout layer only in a portion having a temperature between $T_1$ and $T_3$, said reproducing device includes means for projecting the laser light beam onto said magneto-optical recording medium so that a spot of the laser light beam is shifted relative to said magneto-optical recording medium, and an intensity of the laser light beam projected from said reproducing device is set such that a portion of said magnetic film having a highest temperature has a temperature lower than $T_2$ and higher than $T_3$.

* * * * *